United States Patent
Kobayashi

(10) Patent No.: US 11,400,878 B2
(45) Date of Patent: Aug. 2, 2022

(54) AIRBAG DEVICE FOR A PASSENGER SEAT

(71) Applicant: TOYODA GOSEI CO., LTD., Kiyosu (JP)

(72) Inventor: Hironao Kobayashi, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/202,798

(22) Filed: Mar. 16, 2021

(65) Prior Publication Data

US 2021/0300281 A1 Sep. 30, 2021

(30) Foreign Application Priority Data

Mar. 31, 2020 (JP) ................................ JP2020-61820
Mar. 31, 2020 (JP) ................................ JP2020-61821

(51) Int. Cl.
*B60R 21/205* (2011.01)
*B60R 21/2338* (2011.01)

(52) U.S. Cl.
CPC ........ *B60R 21/205* (2013.01); *B60R 21/2338* (2013.01)

(58) Field of Classification Search
CPC . B60R 21/205; B60R 21/2338; B60R 21/237; B60R 2021/23382
See application file for complete search history.

(56) References Cited

U.S. PATENT DOCUMENTS

| | | | | |
|---|---|---|---|---|
| 2004/0256848 | A1* | 12/2004 | Miyata | B62J 27/20 280/743.2 |
| 2006/0049618 | A1* | 3/2006 | Bito | B60R 21/2346 280/732 |
| 2006/0113776 | A1 | 6/2006 | Iida et al. | |
| 2007/0205591 | A1* | 9/2007 | Bito | B60R 21/233 280/743.2 |
| 2013/0056967 | A1* | 3/2013 | Miyata | B60R 21/205 280/743.1 |
| 2015/0001836 | A1* | 1/2015 | Yamada | B60R 21/231 280/732 |

(Continued)

FOREIGN PATENT DOCUMENTS

| | | |
|---|---|---|
| EP | 3511208 A1 | 7/2019 |
| JP | 2006-151265 A | 6/2006 |

(Continued)

*Primary Examiner* — Drew J Brown
(74) *Attorney, Agent, or Firm* — Posz Law Group, PLC

(57) ABSTRACT

An airbag device for a passenger seat includes an airbag that has a folded form and is stored in a storage disposed in an instrument panel. The airbag includes a bag body and a tether section. The tether section includes a left-right tether that connects a left wall and a right wall of the bag body for regulating a distance between the left and right walls at airbag deployment, and is configured to be deployed generally along a left and right direction of the bag body as deployed, and a front-rear tether that connects a central portion in a left and right direction of the left-right tether and a central portion in a left and right direction of a passenger-side wall for preventing the passenger-side wall from protruding rearward at airbag deployment, and is configured to be deployed in a front and rear direction of the bag body as deployed.

7 Claims, 15 Drawing Sheets

(56) References Cited

U.S. PATENT DOCUMENTS

| | | | |
|---|---|---|---|
| 2015/0042081 A1* | 2/2015 | Yamada | B60R 21/205 |
| | | | 280/730.1 |
| 2015/0115577 A1 | 4/2015 | Miura et al. | |
| 2018/0022303 A1* | 1/2018 | Yamada | B60R 21/2338 |
| | | | 280/732 |
| 2019/0092268 A1 | 3/2019 | Ishida et al. | |
| 2020/0247350 A1* | 8/2020 | Hosoe | B60R 21/2346 |
| 2021/0061216 A1* | 3/2021 | Ito | B60R 21/216 |

FOREIGN PATENT DOCUMENTS

| | | |
|---|---|---|
| JP | 2013-35459 A | 2/2013 |
| JP | 2016-26942 A | 2/2016 |
| JP | 2018-99928 A | 6/2018 |
| JP | 2019-64282 A | 4/2019 |
| WO | 2018-047617 A1 | 3/2018 |

\* cited by examiner

Sectional View at A-A

AIRBAG DEVICE FOR A PASSENGER SEAT

CROSS REFERENCE TO RELATED APPLICATIONS

The present application claims priority from Japanese Patent Application No. 2020-061821 of Kobayashi, filed on Mar. 31, 2020 and Japanese Patent Application No. 2020-061820 of Kobayashi, filed on Mar. 31, 2020, the entire disclosures of which are incorporated herein by reference.

BACKGROUND

1. Technical Field

The present invention relates to an airbag device for a passenger seat including an airbag that is adapted to be stored in a storage provided inside an instrument panel of a vehicle which is located in front of a passenger seat, and is deployable rearward for protecting a passenger when fed with an inflation gas.

2. Description of Related Art

JP2019-64282 A discloses an airbag device for a passenger seat including an airbag that includes a bag body and a tether section disposed inside the bag body for controlling a shape of the bag body as inflated. The tether section includes a front-rear tether that is arranged generally along a front and rear direction and connects a front end portion of the bag body as inflated and a passenger-side wall disposed in a rear end portion of the bag body as inflated, and a left-right tether that is arranged generally along a left and right direction and connects a left-side wall and a right-side wall of the bag body which are opposed to one another in the left and right direction at airbag deployment. The front-rear tether and left-right tether are provided separately and arranged to intersect one another in a cross shape as viewed from above.

However, the above configuration that the front-rear tether and left-right tether provided separately inside the bag body are arranged in a generally orthogonally crossed fashion as viewed from above, and that the front-rear tether and left-right tether are each connected to the bag body so as not to be engaged with one another complicates the connecting work of the tethers, and has a room for improvement in the light of folding the airbag compactly for storage. It would be desirable to provide an improved airbag device for a passenger seat an airbag of which has a simple structure, is compactly folded, and is inflated into a desired shape.

JP2016-26942 A discloses an airbag device for a passenger seat that includes an airbag that is stored in a storage in a reduced size in a front and rear direction and in a left and right direction by folding, and a regulating member that is provided separate from the airbag for controlling inflation and deployment of the airbag. More specifically, the airbag as folded includes a folded portion in which a rear portion of the airbag as inflated is folded from the lower end. The folded portion is temporary held by a pocket-like temporary holding portion of the regulating member. The regulating member acts to delay the start of unfolding of the folded portion slightly in an initial stage of airbag deployment.

However, it would be desirable to provide an improved airbag device for a passenger seat an unfolding of an airbag of which is controlled for smooth protection of a passenger without using such a separate regulating member.

SUMMARY

An exemplary embodiment of the invention relates to an airbag device for a passenger seat of a vehicle adapted to be installed in a storage in an instrument panel disposed in front of a passenger seat. The airbag device includes an airbag that has a folded form and is configured to be inflated and deployed rearward for protecting a passenger when fed with an inflation gas. The airbag includes a bag body that is formed of a sheet member having flexibility and includes: a passenger-side wall that is configured to be deployed toward the passenger seat; a circumferential wall that extends from a circumferential edge of the passenger-side wall to a front end portion of the bag body in a narrowing fashion, by which front end portion the bag body is configured to be mounted on the storage, the circumferential wall including a left wall and a right wall that are opposed to one another at airbag deployment; and an inlet port that is disposed in the front end portion of the circumferential wall for receiving the inflation gas. The airbag further includes a tether section that is disposed inside the bag body for controlling a shape of the bag body as inflated. The tether section includes: a left-right tether that connects the left wall and the right wall of the circumferential wall for regulating a distance between the left wall and right wall at airbag deployment, the left-right tether being configured to be deployed generally along a left and right direction of the bag body as deployed; and a front-rear tether that connects a central portion in a left and right direction of the left-right tether and a central portion in a left and right direction of the passenger-side wall for preventing the passenger-side wall from protruding rearward at airbag deployment, the front-rear tether being configured to be deployed in a front and rear direction of the bag body as deployed.

Another exemplary embodiment of the invention relates to an airbag device for a passenger seat of a vehicle adapted to be installed in a storage in an instrument panel disposed in front of a passenger seat. The airbag device includes an airbag that has a folded form and is configured to be inflated and deployed rearward for protecting a passenger when fed with an inflation gas. The airbag is formed of a sheet member having flexibility, and includes a passenger-side wall that is configured to be deployed toward the passenger seat; a circumferential wall that extends from a circumferential edge of the passenger-side wall to a front end portion of the airbag in a narrowing fashion, by which front end portion the airbag is configured to be mounted on the storage; and an inlet port that is disposed in the front end portion of the circumferential wall for receiving the inflation gas. The folded form of the airbag has been formed through: a preparatory folding that develops the passenger-side wall generally flatly and folds the circumferential wall on one or more valley folds so that the passenger-side wall as developed is brought close to the inlet port, the preparatory folding providing a preparatory folded form of the airbag; a first front-rear contracting folding that contracts a width in a front and rear direction of the airbag, the first front-rear contracting folding providing a front-rear contracted form of the airbag; a left-right contracting folding that contracts a width in a left and right direction of the airbag after the first front-rear contracting folding, the left-right contracting folding providing a left-right contracted form of the airbag; and a second front-rear contracting folding that contracts the width in the front and rear direction of the airbag after the left-right contracting folding. The front-rear contracted form of the airbag includes a rear folded portion in which a portion of the preparatory folded form disposed farther to the rear from the inlet port is folded toward the circumferential wall on a plurality of creases extending in the left and right direction so that a rear end of the preparatory folded form comes close to the inlet port. The left-right contracted form of the airbag includes a left and a right rolled portions in which a left and a right edge portions of the front-rear contracted form are rolled toward the passenger-side wall.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Especially, in the following detailed description, for purposes of explanation, numerous specific details are set forth in order to provide a thorough understanding of the disclosed embodiments. It will be apparent, however, that one or more embodiments may be practiced without these specific details.

Figure 13:
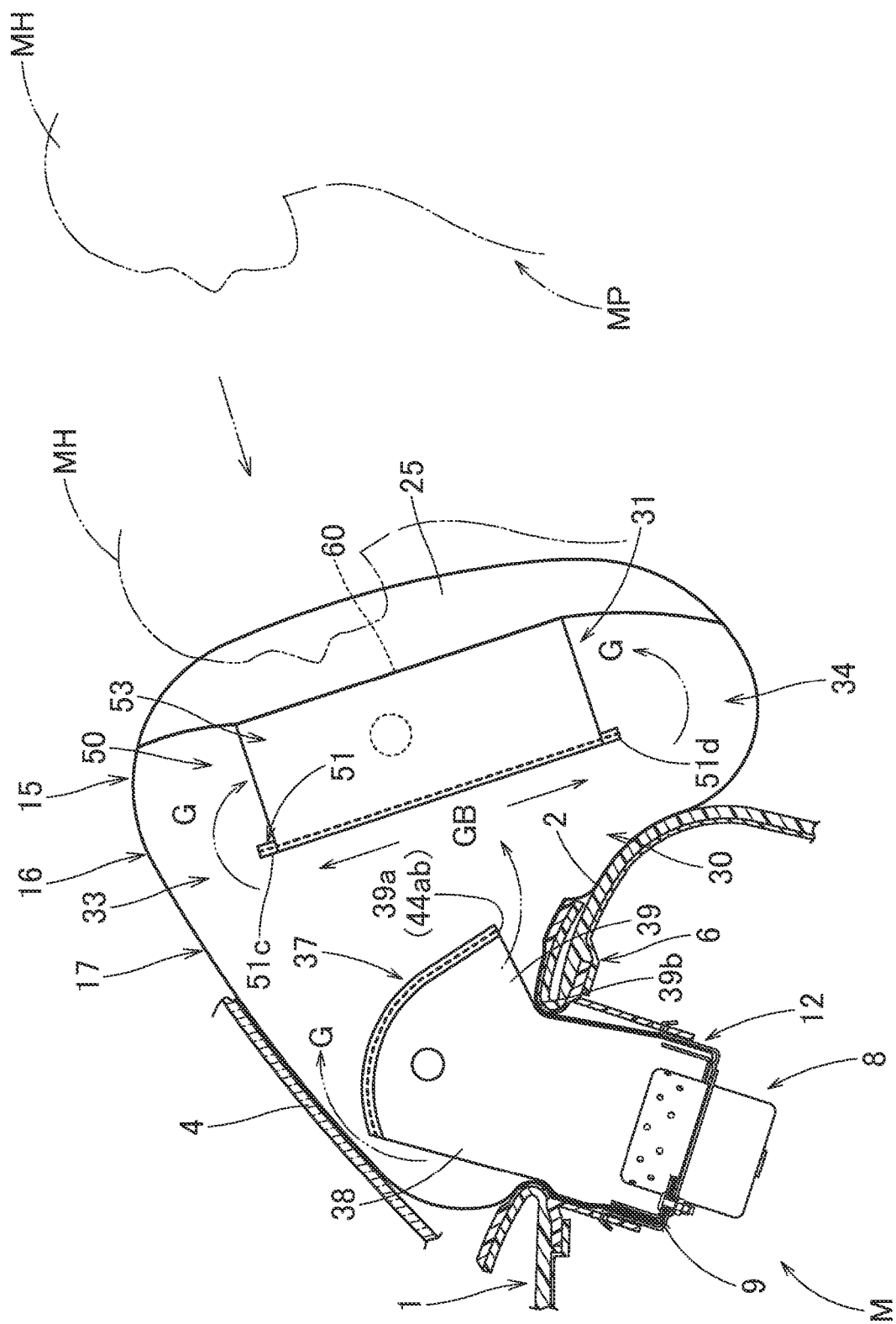
FIG. 13 is a schematic vertical sectional view of the airbag of the airbag device in accordance with the exemplary embodiment as fully inflated and deployed.
Figure 14:
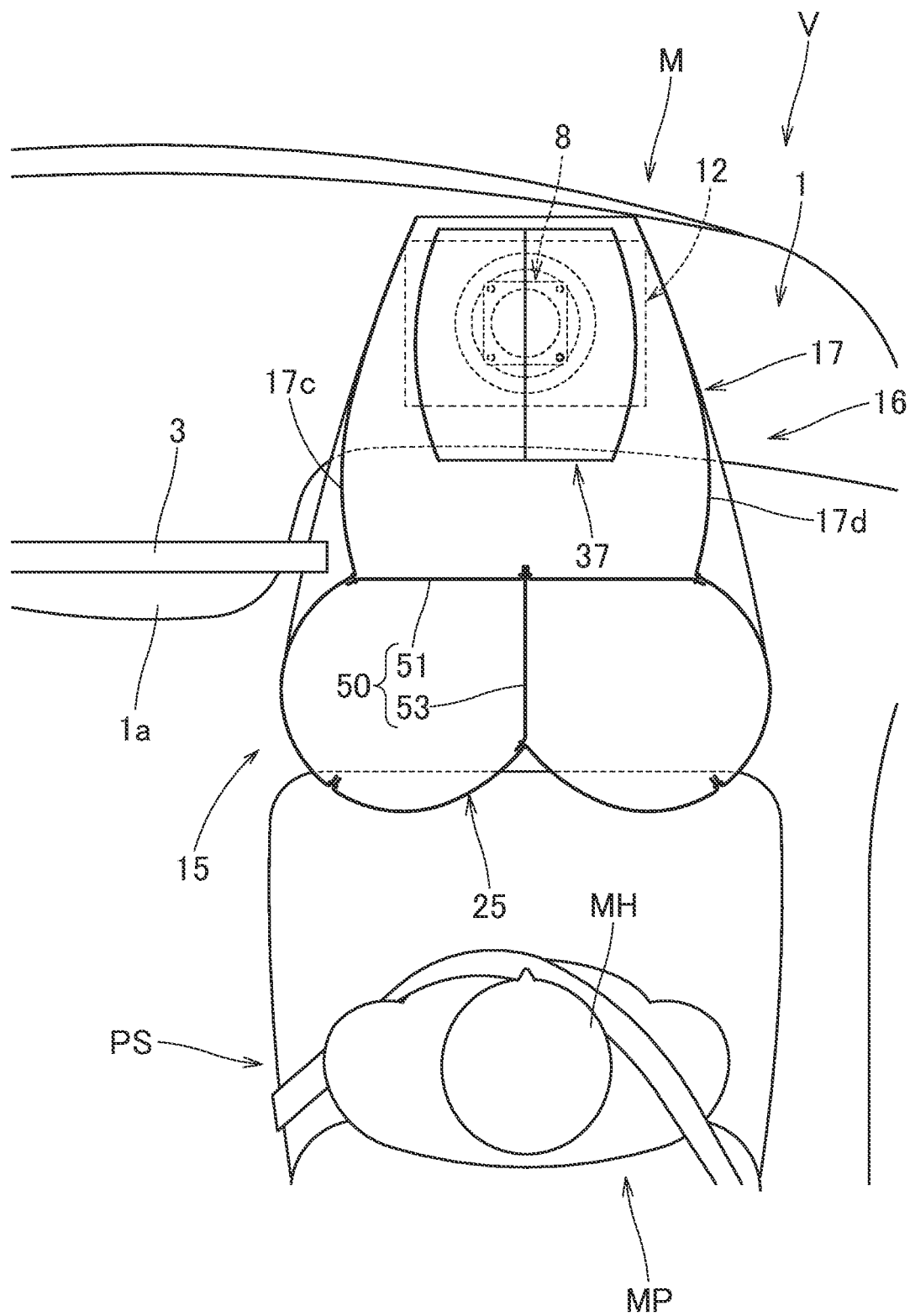
FIG. 14 is a schematic horizontal sectional view of the airbag of the airbag device in accordance with the exemplary embodiment as fully inflated and deployed.

As can be seen in FIGS. 13 and 14, an airbag device M for a passenger seat in accordance with an exemplary embodiment is mounted on a vehicle V in which a passenger seat PS is disposed on the right side while a not-shown driver's seat disposed in the left side. The airbag device M is a top-mount airbag device that is stored inside a top surface 2 of an instrument panel or dashboard 1 disposed in front of the passenger seat PS. As can be seen in FIG. 14, a monitor 3 of a car navigation system (which serves as a protruding object) is disposed in a vicinity of a rear end of a central region 1a of the dashboard 1, which central region 1a is disposed at a central position in width of the vehicle V and in front of an area between the not-shown driver's seat and passenger seat PS, in such a manner as to protrude upward partially from the top surface 2 of the dashboard 1 (see dashed-and-double-dotted lines in FIG. 15). Unless otherwise specified, a front and rear direction, an up and down direction and a left and right direction in the following disclosure correspond to a front and rear direction, an up and down direction and a left and right direction of the vehicle V, respectively.

As shown in FIGS. 13 and 14, the airbag device M includes an airbag 15, which is folded up, an inflator 8 for supplying the airbag 15 with an inflation gas, a case or storage 12 for housing and holding the airbag 15 and inflator 8, a retainer 9 for mounting the airbag 15 and inflator 8 on the case 12, and an airbag cover 6 for covering the airbag 15. The airbag cover 6 is provided with a pair of doors (reference signs omitted) configured to open at airbag deployment.

Referring to FIGS. 1 to 4, the airbag 15 includes a bag body 16 that is inflatable with an inflation gas, a redirecting cloth 37 that is configured to control flow of inflation gas into the bag body 16, and a tether section 50 that is disposed inside the bag body 16 for controlling the shape of the bag body 16 as fully inflated.

The bag body 16 is designed to fill up a space between the top surface 2 of the dashboard 1 and a windshield 4 disposed above the dashboard 1 when inflated and deployed, as shown in FIG. 13. More specifically, the bag body 16 is designed to be inflated into a generally square pyramid shape whose top is located at the front end as shown in FIG. 1, and includes a passenger-side wall 25 that is deployable toward the passenger seat PS for arresting a passenger MP, and a circumferential wall 17 that extends from a circumferential edge of the passenger-side wall 25 toward the front end, by which the bag body 16 is mounted on the case 12, in a narrowing fashion, as shown in FIGS. 2 and 4.

The circumferential wall 17 is configured to be deployed mainly in such a manner as to fill the space between the top surface 2 of the dashboard 1 and the windshield 4 at airbag deployment, and includes an upper wall 17a and a lower wall 17b that are deployed generally along a left and right direction in the upper side and lower side of the bag body 16, respectively, and a left wall 17c and a right wall 17d that are disposed generally along a front and rear direction in the left side and right side of the bag body 16, respectively. A generally round gas inlet port 20 is disposed in a vicinity of the front end of and generally at the center in a left and right direction of the lower wall 17b for receiving an inflation gas. A plurality of (four, in the illustrated embodiment) mounting holes 21 are formed in a periphery of the inlet port 20 for receiving bolts (reference sign omitted) of the retainer 9. The bag body 16 is mounted on a bottom wall (reference sign omitted) of the case 12 by the periphery of the inlet port 20. Each of the left wall 17c and right wall 17d of the circumferential wall 17 is provided with a generally round vent hole 23 for releasing an extra inflation gas. In the illustrated embodiment, as shown in FIG. 2, each of the vent holes 23 is disposed at a farther rearward position than a later-described left-right tether 51 of the tether section 50, in other words, in a region of a later-described rear inflatable portion 31.

Figure 3:
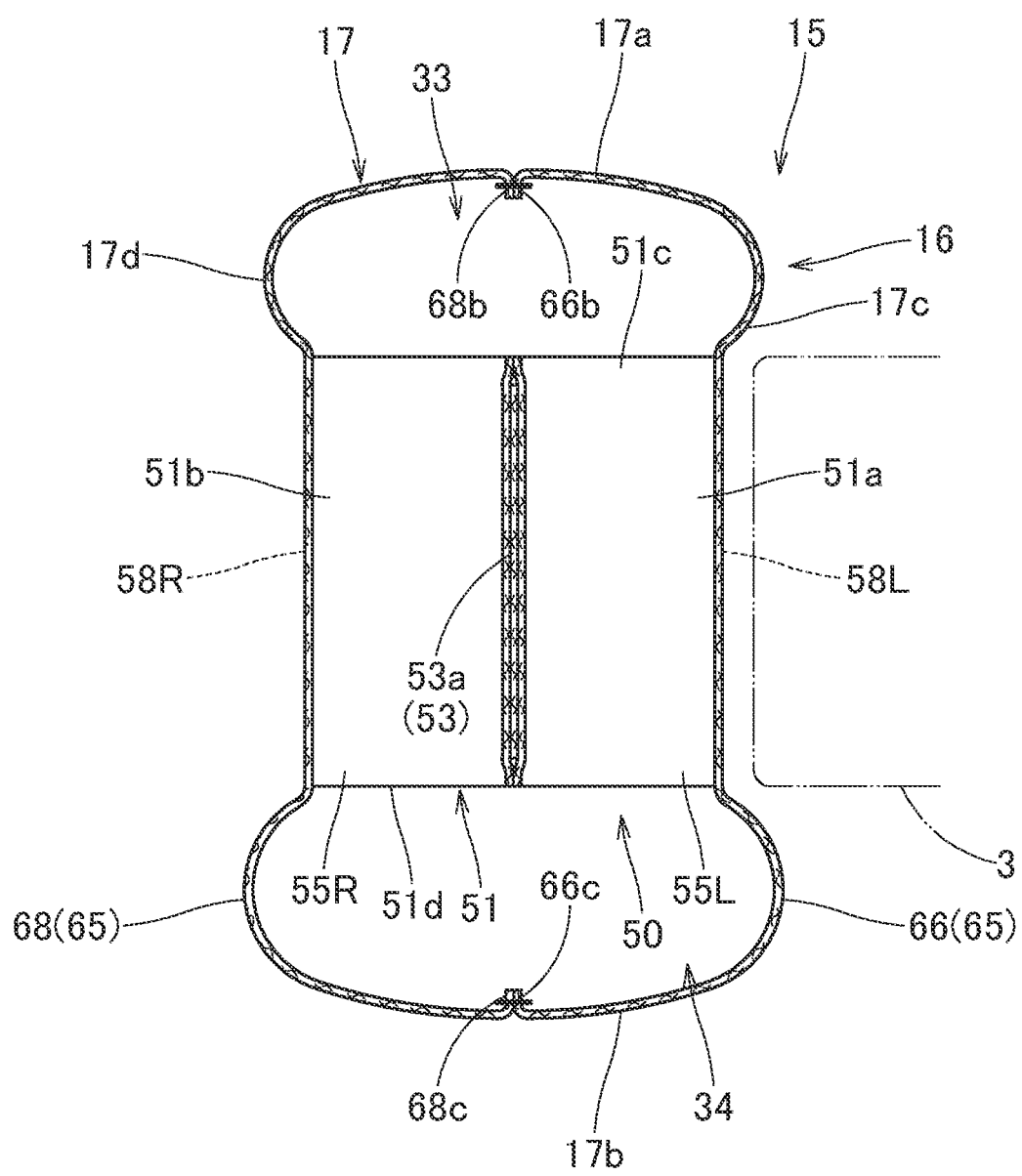
FIG. 3 is a schematic vertical sectional view of the airbag of FIG. 1 taken along a left and right direction.

The passenger-side wall 25 is configured to be deployed generally vertically at the rear end of the bag body 16 so as to face the front-seat passenger MP, as can be seen in FIG. 3.

Figure 1:
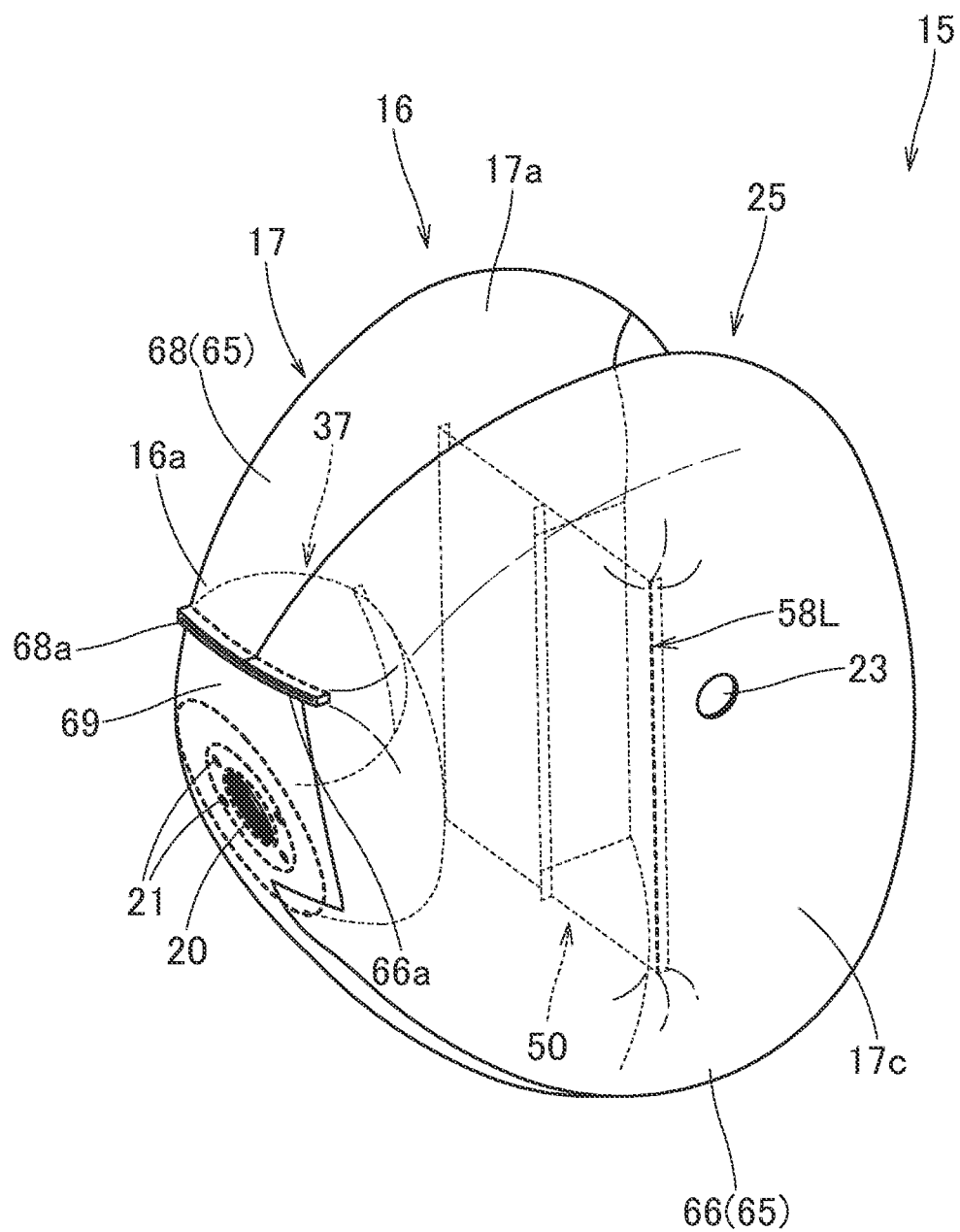
FIG. 1 is a schematic perspective view of an airbag for use in an airbag device for a passenger seat in accordance with the exemplary embodiment, in which the airbag is inflated by itself.
Figure 2:
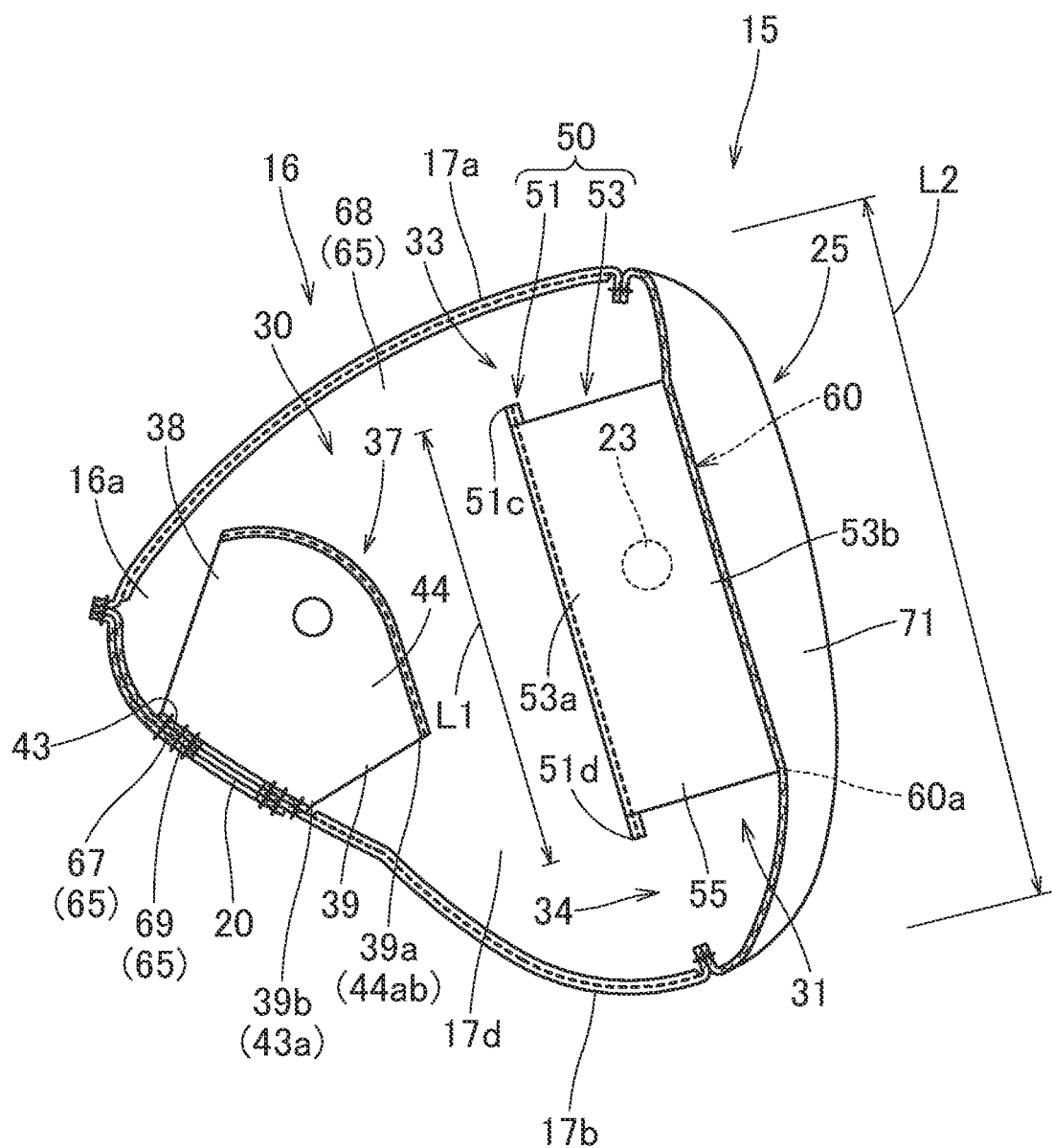
FIG. 2 is a schematic vertical sectional view of the airbag of FIG. 1 taken along a front and rear direction.
Figure 4:
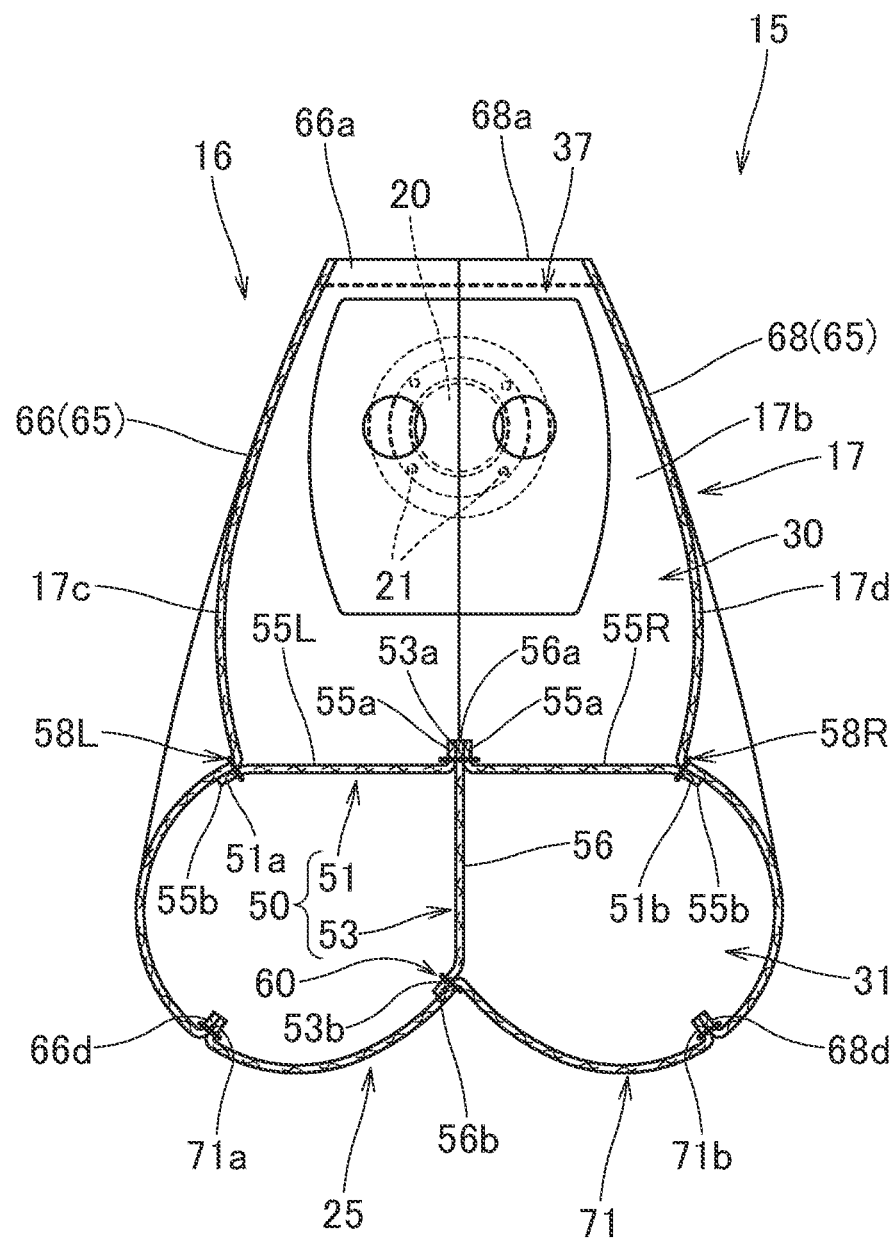
FIG. 4 is a schematic horizontal sectional view of the airbag of FIG. 1 taken along the front and rear direction.

Referring to FIGS. 1, 2 and 4, the redirecting cloth 37 is disposed over the inlet port 20 inside the bag body 16 for redirecting an inflation gas G having flown into the bag body 16 towards the front and rear. The redirecting cloth 37 is formed into a generally tubular shape provided with a front outlet port 38 and a rear outlet port 39 in the front end and rear end, respectively. The redirecting cloth 37 is composed of a base member 42 depicted in FIG. 5. The base member 42 of the redirecting cloth 37 includes a mounting portion 43 that is disposed in the center and jointed to the periphery of the inlet port 20 of the bag body 16, and main bodies 44 that extend to the left and right from the mounting portion 43 and form the redirecting cloth 37. The main bodies 44 are joined together by edges 44a to form the redirecting cloth 37. As will be described later, at full deployment of the airbag 15, a rear end 44ab (FIG. 5) of each of the edges 44a of the base member 42 constitutes an upper end 39a (FIG. 2) of the rear outlet port 39, and a center 43a (FIG. 5) of the rear edge of the mounting portion 43 constitutes a lower end 39b of the rear outlet port 39.

As shown in FIGS. 1 to 4, the tether section 50 disposed inside the bag body 16 includes a left-right tether 51 and a front-rear tether 53 that are arranged to form a T shape in combination as viewed from above.

Figure 15:
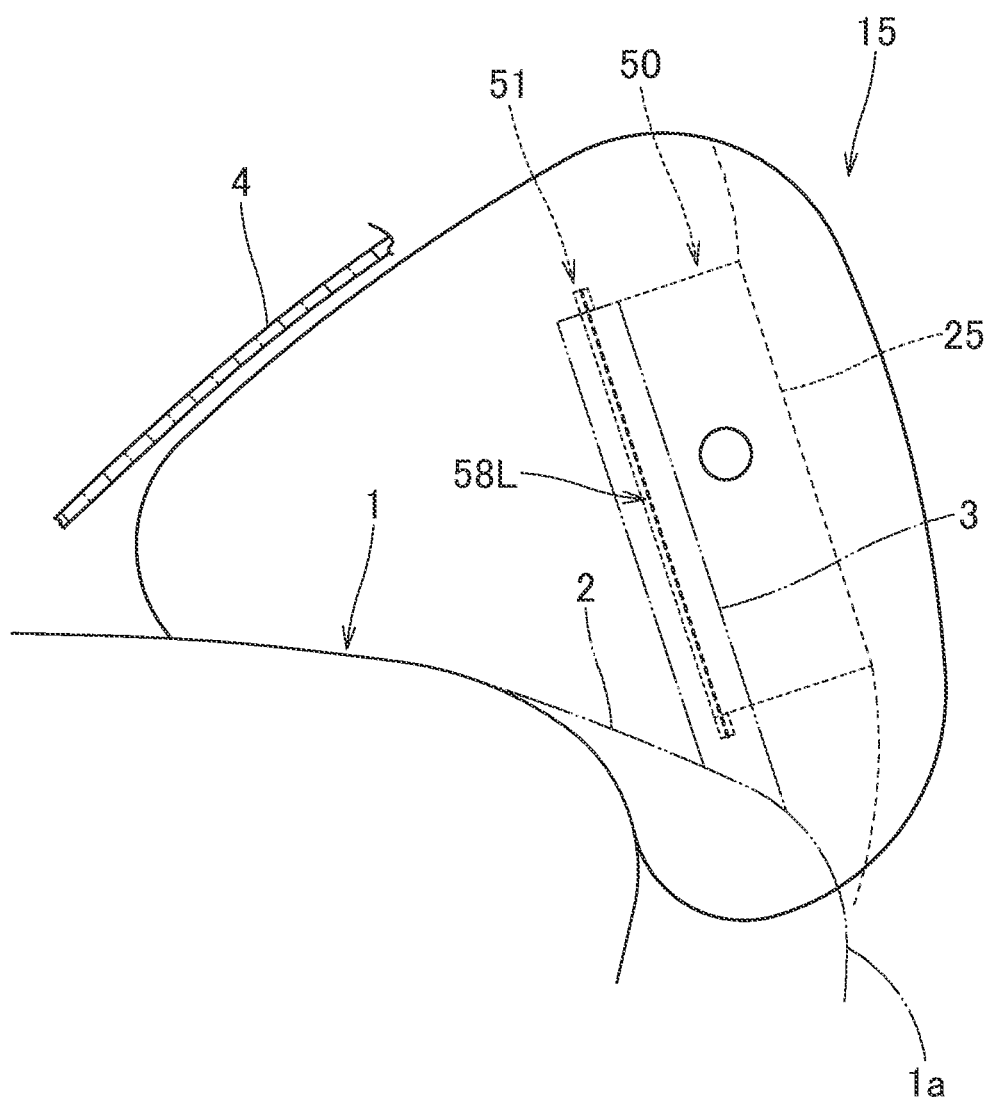
FIG. 15 is a schematic side view of the airbag of the airbag device in accordance with the exemplary embodiment as fully inflated and deployed.

The left-right tether 51 connects the left wall 17c and right wall 17d of the circumferential wall 17, which are opposed to one another, and is disposed generally along a left and right direction of the bag body 16 as deployed, as shown in FIGS. 3 and 4, for regulating a distance between the left wall 17c and right wall 17d. In the illustrated embodiment, the left-right tether 51 is composed of a broad band-shaped member that is deployed generally along an up and down direction of the bag body 16 as fully inflated. More specifically, the left-right tether 51 has a generally rectangular shape a width of which in the up and down direction is slightly greater than a width in the left and right direction, as shown in FIG. 3. The left end 51a and right end 51b of the left-right tether 51 are respectively sewn to the left wall 17c and right wall 17d of the circumferential wall 17 by the entire length with sewing threads. More particularly, as shown in FIGS. 2 and 15, the left-right tether 51 is disposed generally in parallel to the passenger-side wall 25, generally at the center in the front and rear direction and in the up and down direction of the left wall 17c and right wall 17d, in a portion of the bag body 16 having a greatest width in the up and down direction, as viewed from the side of the bag body 16 as fully inflated. A width (or length) L1 in the up and down direction of the left-right tether 51 is approximately three fifths of a width L2 (FIG. 2) of the portion having the greatest width in the up and down direction in the bag body 16 as fully inflated and viewed from the side, and the left-right tether 51 is disposed in the bag body 16 as fully inflated such that a void space is formed each between the upper end 51c and upper wall 17a and between the lower end 51d and lower wall 17b, as shown in FIGS. 2 and 3. That is, the left-right tether 51 partitions the bag body 16 into a front inflatable portion 30 and a rear inflatable portion 31 as shown in FIGS. 2 and 4. The front inflatable portion 30 and rear inflatable portion 31 communicate with one another via an upper communicating portion 33 and a lower communicating portion 34 respectively composed of the void spaces formed between the left-right tether 51 and upper wall 17a and between the left-right tether 51 and lower wall 17b, as shown in FIGS. 2 and 3. In other words, the left-right tether 51 includes, in a vicinity of each of the upper end 51c and the lower end 51d, the upper communicating portion 33 and the lower communicating portion 34 for gas communication.

The left-right tether 51 of the illustrated embodiment is arranged such that the upper end 51c is located at a higher position than the upper end 39a of the rear outlet port 39 of the redirecting cloth 37, and the lower end 51d is located at a lower position than the lower end 39b of the rear outlet port 39, in a vertical sectional view taken generally along the front and rear direction of the airbag 15 as fully inflated by itself, as can be seen in FIG. 2. That is, the left-right tether 51 is designed to cover the rear outlet port 39 of the redirecting cloth 37 entirely from the back at airbag deployment. When the airbag 15 is mounted on board, a lower portion of the rear outlet port 39 of the redirecting cloth 37 is disposed inside the case 12 as shown in FIG. 13. Even when the airbag 15 is inflated as mounted on board, the upper end 51c of the left-right tether 51 is located at a higher position than the upper end 39a of the rear outlet port 39 of the redirecting cloth 37, and the lower end 51d is located at a lower position than the lower end 39b of the rear outlet port 39 (that is a lower end of a portion of the rear outlet port 39 protruding upward from the dashboard 1 or airbag cover 6), thus the left-right tether 51 covers a rear side of the rear outlet port 39 of the redirecting cloth 37 entirely, as shown in FIG. 13.

The left-right tether 51 is provided in order to prevent the left wall 17c and right wall 17d of the airbag 15 from being separated from one another excessively at airbag deployment and to regulate a distance between the left wall 17c and right wall 17d at airbag deployment. The width in the left and right direction of the left-right tether 51 is determined so that a portion in the left wall 17c around a left joint 58L of the left-right tether 51 and a portion in the right wall 17d around a right joint 58R of the tether 51 dent inward in the left and right direction at airbag deployment, as shown in FIGS. 3 and 4. Each of the left joint 58L and right joint 58R that joints (or sews) a left end 51a/a right end 51b of the left-right tether 51 to the left wall 17c/the right wall 17c is formed over an entire length of the left end 51a/the right end 51b continuously.

The monitor 3 of the car navigation system is disposed on the left side of and in proximity to the airbag 15 as deployed, as shown in FIGS. 3 and 15 (by dashed- and double-dotted lines) and FIG. 14. The left-right tether 51 of the airbag 15 in the illustrated embodiment is designed to be deployed at a position corresponding to the monitor 3 of the car navigation system which serves as a protruding object that protrudes partially from the dashboard 1. As can be seen in FIG. 15, the left-right tether 51 of the illustrated embodiment is designed so that the joint (i.e. the left joint) 58L of the left end 51a to the left wall 17c is disposed at the position corresponding to the monitor 3 and generally along the monitor 3 at airbag deployment. That is, as described above, since the airbag 15 is designed so that the portion of the left wall 17c in a periphery of the left joint 58L dents inward in the left and right direction and the left joint 58L is designed to be deployed at the position corresponding to the monitor 3 at airbag deployment, the airbag 15 is prevented from being brought into engagement with the monitor 3 which is disposed proximate the left wall 17c.

The front-rear tether 53 connects a central portion in the left and right direction of the left-right tether 51 and a central portion in the left and right direction of the passenger-side wall 25, and extends in the front and rear direction at airbag deployment, as shown in FIGS. 2 and 4. The front end 53a of the front-rear tether 53 is jointed to the left-right tether 51 and the rear end 53b is jointed to the passenger-side wall 25. The front-rear tether 53 is provided in order to prevent the passenger-side wall 25 from protruding rearward at airbag deployment. The front-rear tether 53 is composed of a broad band-shaped member disposed generally along the up and down direction at airbag deployment. More specifically, a width (or length) in the up and down direction of the front-rear tether 53 is slightly smaller than the width (or length) in the up and down direction of the left-right tether 51. In the illustrated embodiment, the width (or length) in the up and down direction of the front-rear tether 53 is approximately five sixths of that of the left-right tether 51. That is, a rear end 53b portion (as a jointed end) of the front-rear tether 53 that is jointed to the passenger-side wall 25 has a smaller width in the up and down direction than the left-right tether 51. The width in the front and rear direction of the front-rear tether 53 is determined so that a portion in the passenger-side wall 25 around a rear joint 60, which joints the rear end 53b of the front-rear tether 53 to the passenger-side wall 25, slightly dents forward at airbag deployment. The rear joint 60 that joints the rear end 53b of the front-rear tether 53 to the passenger-side wall 25 is designed to be disposed generally along the up and down direction at a central portion in the up and down direction and in the left and right direction of the passenger-side wall 25 at airbag deployment. The rear joint 60 is formed continuously over an entire length of the rear end 53b portion of the front-rear tether 53. The rear joint 60 has a smaller length than the left joint 58L and the right joint 58R that joint the left end 51a and right end 51b of the left-right tether 51 respectively to the left wall 17c and the right wall 17d. More particularly, the length L3 (FIG. 5) of the rear joint 60 is approximately three sevenths of a width L4 (FIG. 5) in the up and down direction of a later-described passenger-side panel 71 forming mainly the passenger-side wall 25, and approximately five eighths of a width L5 (FIG. 6A) in the up and down direction of the passenger-side wall 25 in a later-described preparatory folded form 75 of the airbag 15.

Figure 5:
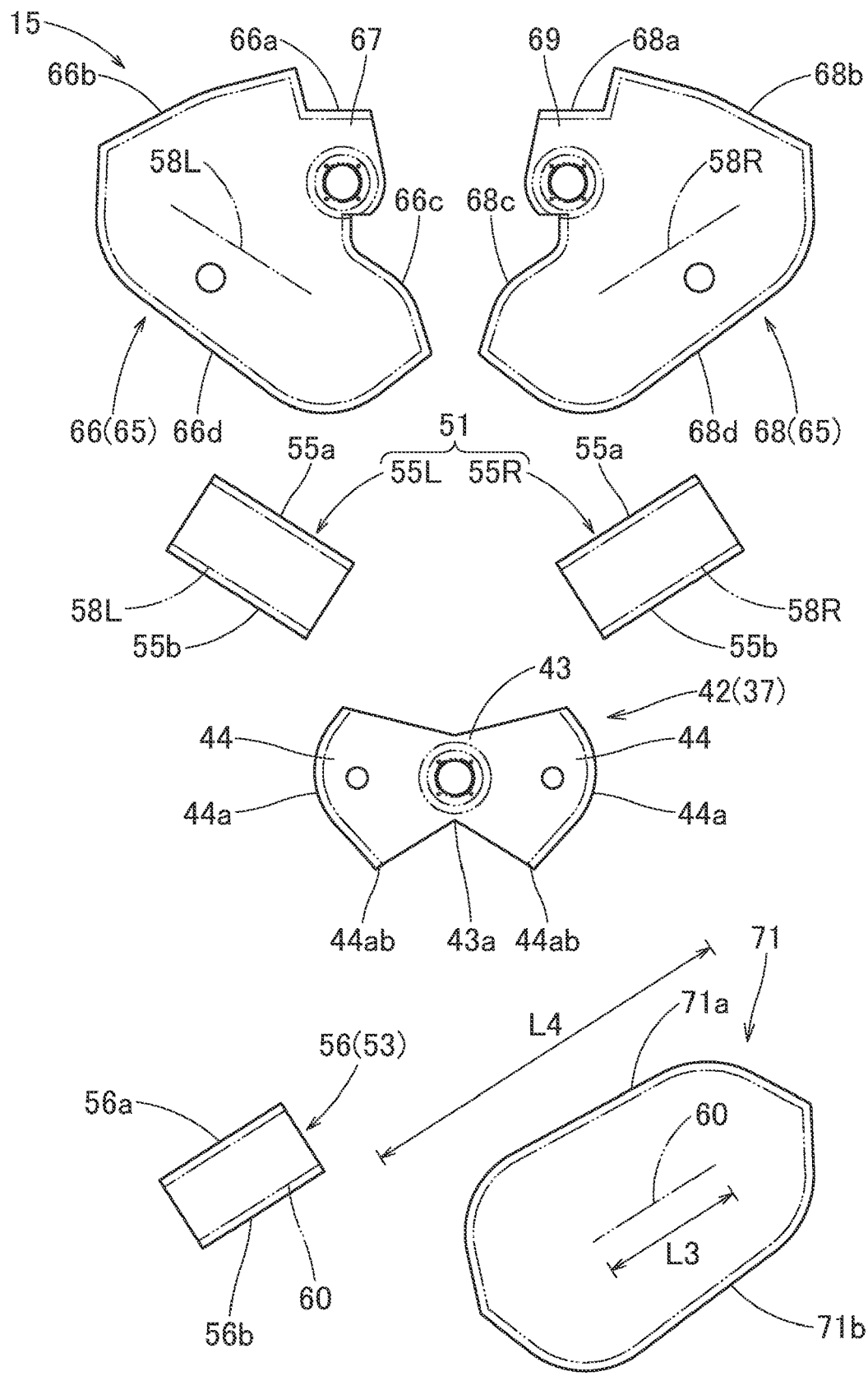
FIG. 5 depicts base members of the airbag of FIG. 1 in plan.

As shown in FIGS. 4 and 5, the tether section 50 of the illustrated embodiment is composed of two base members 55L, 55R that form the left-right tether 51, and a tether member 56 that forms the front-rear tether 53. The base members 55L, 55R of the left-right tether 51 are generally identical in outer shape and each formed into a generally rectangle elongated in the up and down direction. The base member 56 of the front-rear tether 53 is formed into a generally rectangle elongated in the up and down direction. More specifically, the base member 56 of the front-rear tether 53 is slightly smaller both in widths in the length direction (i.e. in the up and down direction) and in the width direction (i.e. in the front and rear direction) than each of the base members 55L, 55R of the left-right tether 51. The tether section 50 of the illustrated embodiment is formed generally into a T shape as viewed from above by mating an edge 55a each of the base members 55L, 55R and an edge 56a of the base member 56 so that centers in the length direction (i.e. in the up and down direction) of the base members 55L, 55R, 56 generally match and sewing (jointing) the edges 55a, 56a together with sewing threads.

The bag body 16 is formed into a bag shape by jointing together circumferential edges of the base members each having a predetermined shape; circumferential panels 65 that mainly form the circumferential wall 17, and a passenger-side panel 71 that mainly forms the passenger-side wall 25. The circumferential panels 65 include a left-side panel 66 and a right-side panel 68 that respectively form a left region and a right region of the circumferential wall 17. The left-side panel 66 constitutes a left half region of the upper wall 17a, the left wall 17c, and a left half region of the lower wall 17b in the circumferential wall 17. The right-side panel 68 constitutes a right half region of the upper wall 17a, the right wall 17d, and a right half region of the lower wall 17b in the circumferential wall 17. Each of the left-side panel 66 and right-side panel 68 is provided with a protruding portion 67/69 that forms a region in the periphery of the inlet port 20.

In the illustrated embodiment, the circumferential panels 65 (the left-side panel 66 and right-side panel 68) forming the circumferential wall 17, the passenger-side panel 71, the base member 42 of the redirecting cloth 37, and the base members 55L, 55R, 56 of the tether section 50 are formed of a woven fabric having flexibility woven with polyester yarn, polyamide yarn or the like.

Production of the airbag 15 of the illustrated embodiment is now described. Firstly, an edge 55b each of the base members 55L, 55R of the left-right tether 53 is sewn to an inner surface of each of the left-side panel 66 and right-side panel 68 to form the left joint 58L and right joint 58R. Likewise, an edge 56b of the base member 56 of the front-rear tether 51 is jointed to the passenger-side panel 71 to form the rear joint 60. Then the left-side panel 66 and right-side panel 68 are mated and joined together by the lower edges 66c, 68c, then opened so that the upper edges 66b, 68b are separated. Then the protruding portions 67, 69 are laid on one another, and the mounting portion 43 of the base member 42 of the redirecting cloth 37 is placed on an inner surface of the protruding portions 67, 69. The protruding portions 67, 69 and the mounting portion 43 are sewn together at a portion in the periphery of the inlet port 20, then, the inlet port 20 and mounting holes 21 are punched out. Subsequently, upper edges 66b, 68b of the left-side panel 66 and right-side panel 68 are sewn together. Thereafter, a rear edge 66d of the left-side panel 66 and a left edge 71a of the passenger-side panel 71 are sewn together, while a rear edge 68d of the right-side panel 68 and a right edge 71b of the passenger-side panel 71 are sewn together. Then the tether section 50 is formed by sewing together the remaining edges 55a of the base members 55L, 55R of the left-right tether 53 and the remaining edge 56a of the base member 56 of the front-rear tether 51 with sewing threads. The redirecting cloth 37 is formed by sewing the edges 44a of the main bodies 44 of the base member 42 together. Then the bag body 16 is reversed inside out from an unsewn region in front upper edges 66a, 68a of the left-side panel 66 and right-side panel 68. If then each of the front upper edges 66a, 68a of the left-side panel 66 and right-side panel 68 is doubled and sewn up with sewing threads, the bag body 16 as well as the airbag 15 is completed.

Figure 6A:
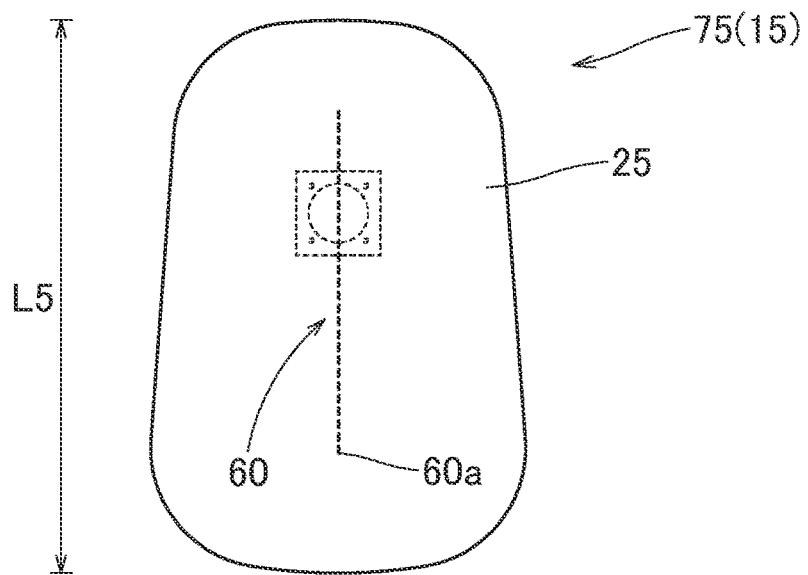
FIG. 6A is a plan view of a preparatory folded form of the airbag of FIG. 1 that is formed by preparatory folding.
Figure 6B:
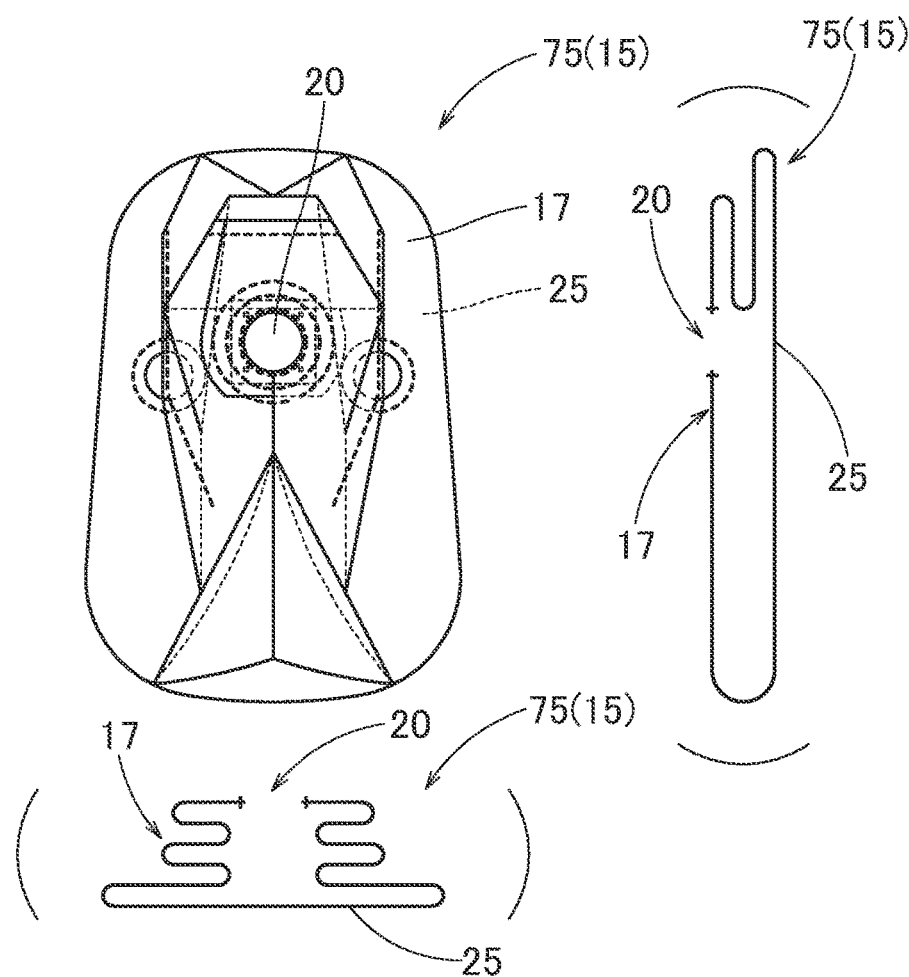
FIG. 6B is a bottom view of the preparatory folded form of the airbag of FIG. 1.

Mounting of the airbag device M on the vehicle V is now described. Firstly, the retainer 9 is housed inside the airbag 15 so that the not-shown bolts protrude from the mounting holes 21, then the airbag 15 is folded up from that state for storage in the case 12. The airbag 15 of the illustrated embodiment is firstly folded into a preparatory folded form 75 by preparatory folding, then folded into the folded body (or folded form) 95, which is a form of the airbag 15 as completely folded up for storage in the case 12, through a first front-rear contracting folding step that contracts a width in the front and rear direction of the airbag 15, a left-right contracting folding step that contracts a width in the left and right direction after the first front-rear contracting step, and a second front-rear contracting folding step that contracts the width in the front and rear direction after the left-right contracting step. The airbag 15 is stored in the case 12 in the form of the folded body 95. More particularly, as can be seen in FIGS. 6A and 6B, the preparatory folded form 75 is formed by developing the passenger-side wall 25 of the airbag 15 generally flatly and folding the circumferential wall 17 on one or more valley folds so that the passenger-side wall 25 is brought close to the inlet port 20.

Figure 7A:
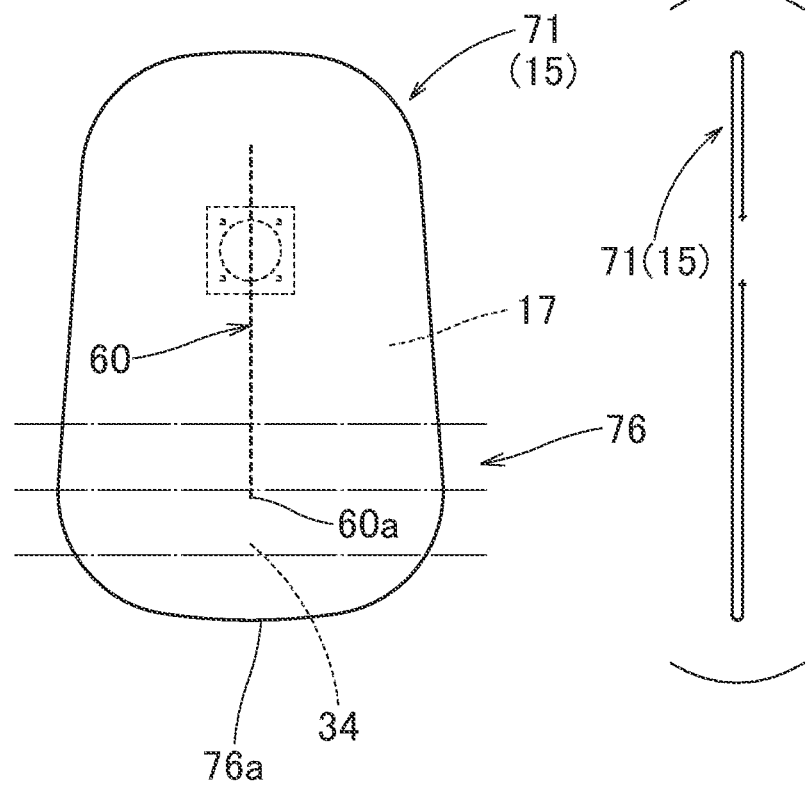
FIGS. 7A to 8C schematically illustrate a folding process of the airbag of FIG. 1.
Figure 7B:
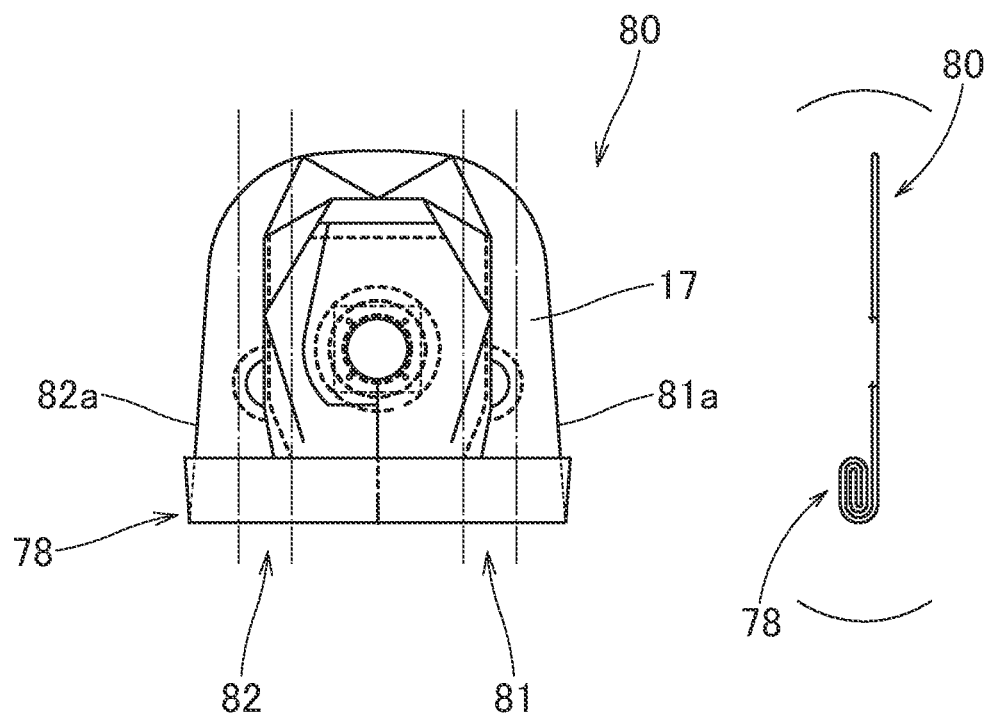
Figure 8A:
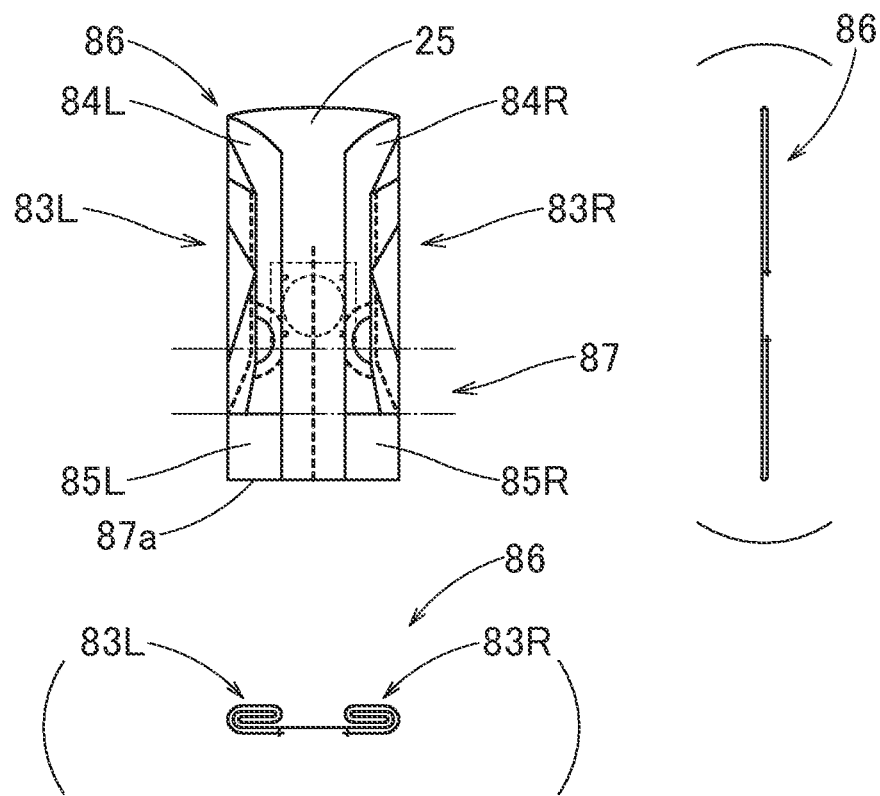
Figure 8B:
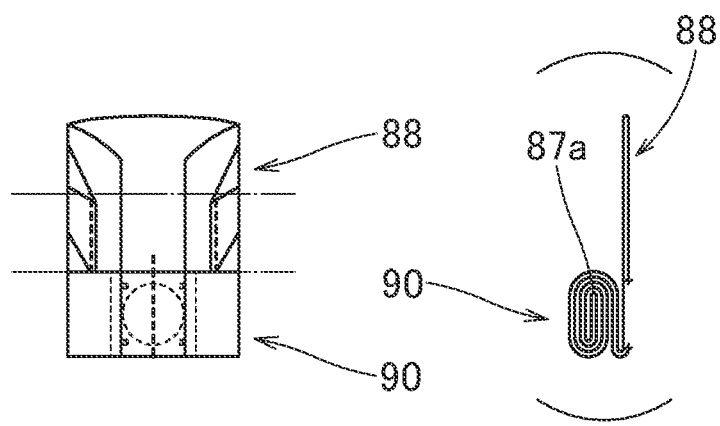
Figure 8C:
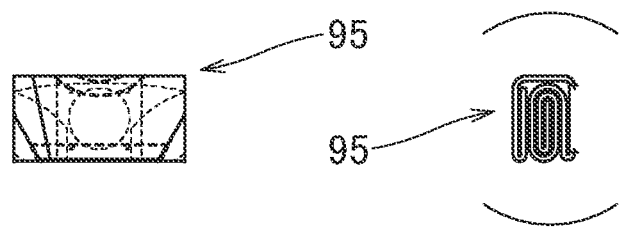

The airbag 15 in the preparatory folded form 75 undergoes the first front-rear contracting folding. Specifically, as shown in FIG. 7A, a portion of the preparatory folded form 75 disposed farther to the rear from the inlet port 20 is folded toward the circumferential wall 17 on a plurality of creases extending in the left and right direction so that the rear end (rear edge or lower edge) of the preparatory folded form 75 comes close to the inlet port 20. This first front-rear contracting folding provides a front-rear contracted form 80 of the airbag 15 with a rear folded portion 78, as can be seen in FIG. 7B. In the illustrated embodiment, the rear folded portion 78 in the front-rear contracted form 80 is composed of an approximately two-fifths region of the preparatory folded form 75 in the rear (or lower) side of the preparatory folded form 75 (namely, rear portion 76). The rear portion 76 is rolled toward the circumferential wall 17 so that the rear edge (or lower edge) 76a comes close to the inlet port 20. Even more specifically, the rear folded portion 78 is rolled such that the rear portion of the preparatory folded form 75 is folded threefold while rolling together or folding in a lower end 60a portion of the rear joint 60 that joints the rear end 53b of the front-rear tether 53 to the passenger-side wall 25, as can be seen in FIGS. 7A and 7B. Subsequently, the airbag 15 in the front-rear contracted form 80 undergoes the left-right contracting folding. Specifically, as can be seen in FIGS. 7B and 8A, a left portion 81 of the front-rear contracted form 80 that is disposed to the left from the inlet port 20 is rolled toward the passenger-side wall 25 so that the left edge 81a comes close to the inlet port 20. Likewise, a right portion 82 of the front-rear contracted form 80 that is disposed to the right from the inlet port 20 is rolled toward the passenger-side wall 25 so that the right edge 82a comes close to the inlet port 20. This left-right contracting folding provides a left-right contracted form 86 of the airbag 15 with a rolled portion 83L and a rolled portion 83R, as can be seen in FIG. 8A. Thereafter, the airbag 15 in the left-right contracted form 86 undergoes the second front-rear contracting folding. Specifically, as can be seen in FIGS. 8A and 8B, a rear portion 87 of the left-right contracted form 86 that is disposed to the rear from the inlet port 20 is folded toward the passenger-side wall 25 at a position in a vicinity of the rear edge of the inlet port 20, and this folded portion is rolled toward the circumferential wall 17 from the rear edge 87a as shown in FIG. 8B, thus providing a rolled portion 90. Then a front portion 88 of the left-right contracted form 86 that is disposed to the front from the inlet port 20 is folded so that the end portion is placed on the rolled portion 90, as shown in FIGS. 8B and 8C. Thus, the folded body (or folded form) 95 for storage in the case 12 is formed.

The airbag 15 (i.e. the folded body 95) thus folded up is then wrapped up by a tearable wrapping sheet (not shown) for keeping the folded-up configuration. Then the folded body 95 is stored in the case 12, and the inflator 8 is mounted on the case 12 together with the periphery of the inlet port 20 of the airbag 15 with the use of the retainer 9. If then the case 12 as holding the airbag 15 and inflator 8 is assembled with the airbag cover 6 disposed in the dashboard 1 as mounted on the vehicle V, the airbag device M is mounted on the vehicle V.

After the airbag device M was mounted on the vehicle, if the inflator 8 is actuated to feed the airbag 15 with an inflation gas G, the airbag 15 is inflated with the inflation gas, pushes and opens the doors of the airbag cover 6, protrudes upward from an opening formed by the opening of the doors, and is deployed rearward and fills the space between the upper surface of the dashboard 1 and windshield 4, as shown in FIGS. 13 to 15.

In the airbag device M in accordance with the exemplary embodiment, the tether section 50 for controlling the shape of the bag body 16 as inflated includes the left-right tether 51 that connects the left wall 17c and right wall 17d of the bag body 16 and the front-rear tether 53 that is formed to extend rearward from the left-right tether 51. With this configuration, the tether section 50 generally forms a T shape as viewed from above. In comparison with a conventional airbag in which a front-rear tether and a left-right tether are separately disposed inside the bag body in a cross shape, this configuration helps reduce an amount of material for forming the tether. It also helps reduce a connecting amount of the tether section 50 to the bag body 16, which simplifies the connecting work as well. As a consequence, the above configuration simplifies the structure of the airbag 15 itself, so that the airbag 15 as folded is compact, as well as the airbag device itself. Moreover, also in the airbag device M in accordance with the exemplary embodiment, the left-right tether 51 of the tether section 50 regulates the distance between the left wall 17c and right wall 17d, and the front-rear tether 53 prevents the passenger-side wall 25 from protruding rearward, so that the outer shape of the bag body 16 as inflated is controlled adequately.

Therefore, with the airbag device M in accordance with the exemplary embodiment, the airbag 15 as folded is compact with a simple structure, and the airbag 15 is controlled adequately in shape as deployed.

Figure 10A:
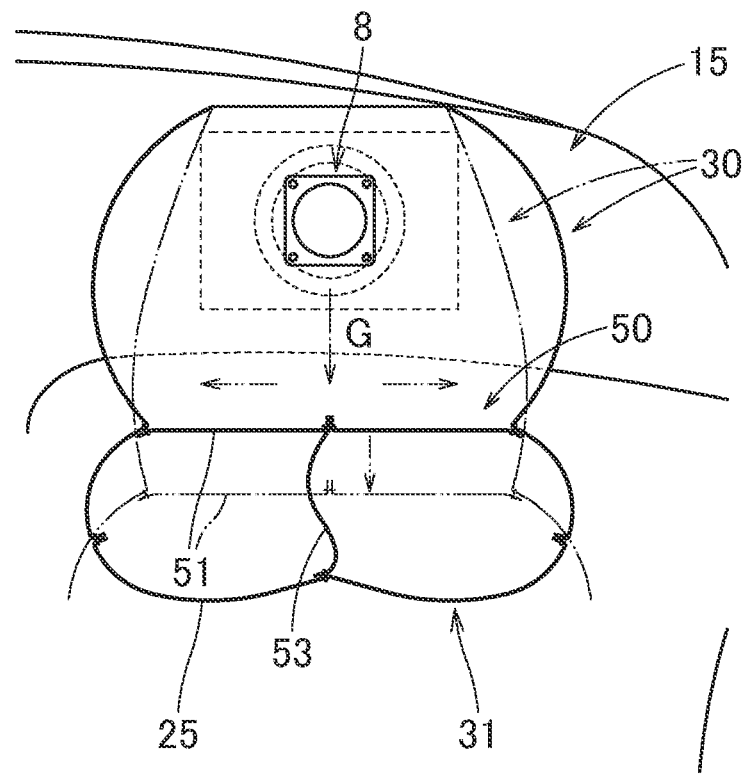
FIGS. 10A and 10B are schematic horizontal sectional views illustrating an inflation process of the airbag in order.
Figure 10B:
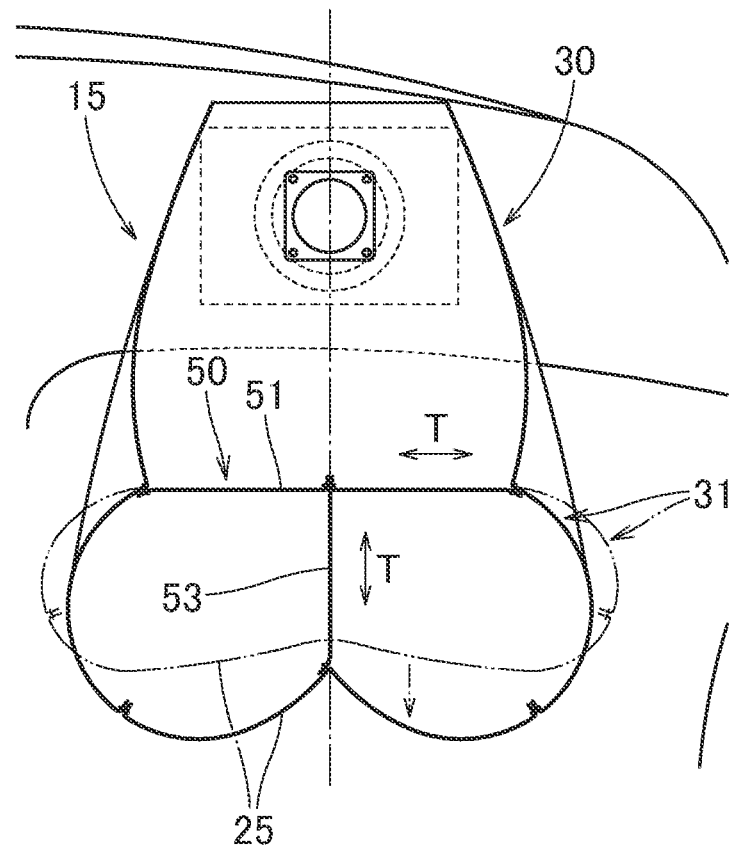

In the airbag device M in accordance with the exemplary embodiment, the left-right tether 51 is composed of a band-shaped member having a broad width that is disposed generally along the up and down direction of the bag body 16 as deployed. Moreover, the left-right tether 51 is arranged inside the bag body 16 so as to partition an interior of the bag body 16 as inflated into the front inflatable portion 30 and the rear inflatable portion 31 while forming the gas communication portions 33, 34 in a vicinity of each of the upper end 51c and lower end 51d. In an initial stage of inflation of the bag body 16 configured as described above, the front inflatable portion 30, which is disposed in front of the left-right tether 51, is inflated first as shown in FIG. 10A, then the rear inflatable portion 31, which is disposed at the rear of the left-right tether 51, is inflated with an inflation gas flown in from the upper communication portion 33 and lower communication portion 34, as shown in FIG. 10B. At the time the inflation gas flows into the rear inflation portion 31, the left-right tether 51 that partitions the front inflatable portion 30 from the rear inflatable portion 31 has become taut (that is, a tensile force T is exerted in the left and right direction), and this acts to exert a tensile force T in the front and rear direction in the front-rear tether 53 as well and prevent the front-rear tether 53 from moving rearward, so that the front-rear tether 53 suppresses the rear inflatable portion 31 from oscillating or wobbling and prevents the passenger-side wall 25 from protruding rearward adequately. If such an advantageous effect does not have to be considered, the left-right tether does not have to have a broad width in the up and down direction so as to be able to partition the bag body into the front and rear. In the illustrated embodiment, the upper communication portion 33 and the lower communication portion 34 are respectively composed of a space between the upper end 51c of the left-right tether 51 and the upper wall 17a and a space between the lower end 51d of the left-right tether 51 and the lower wall 17*b*. However, the configuration of the upper and lower communication portions should not be limited thereby. By way of example, if the left-right tether has an even broader width in the up and down direction and gaps above and beneath the left-right tether are not large enough to ensure steady gas communication to the rear inflatable portion, an auxiliary opening having such a size as to allow limited gas communication toward the passenger-side wall may be formed in a vicinity of each of the upper end and lower end of the left-right tether in the left-right tether so that these openings and the gaps above and beneath the left-right tether constitute the gas communication portion.

In the airbag device M in accordance with the exemplary embodiment, the bag body 16 further includes the redirecting cloth 37 that is disposed over the inlet port 20 inside the bag body 16 for redirecting the inflation gas having flown into the bag body 16 from the inlet port 20 in the front and rear direction of the bag body 16. The redirecting cloth 37 includes the outlet port 39 of the inflation gas at the rear end portion. As shown in FIG. 13, the left-right tether 51 is configured so that the upper end 51*c* is located at a higher position than the upper end 39*a* of this rear outlet port 39 of the redirecting cloth 37, and the lower end 51*d* is located at a lower position than the lower end 39*c* of the outlet port 39, at airbag deployment on board. That is, at airbag deployment, the left-right tether 51 covers the rear outlet port 39 of the redirecting cloth 37 entirely in the up and down direction from the rear. With this configuration, in the initial stage or airbag deployment, an inflation gas GB that exits the rear outlet port 39 of the redirecting cloth 37 and heads rearward hits the left-right tether 51 and does not directly push the passenger-side wall 25 rearward. Instead, the inflation gas GB branches and flows upward and downward at hitting the left-right tether 51, as shown in FIG. 13. Accordingly, the above configuration helps deploy the bag body 16 widely in the up and down direction while suppressing rearward protrusion in the initial stage of airbag deployment, and suppresses the bag body 16 from wobbling or oscillating in the front and rear direction. Thus, the airbag 15 is deployed quickly. If such advantageous effects do not have to be considered, the left-right tether does not have to be configured to cover the rear outlet port of the redirecting cloth entirely from the rear at airbag deployment on board. The airbag may even be formed without a redirecting cloth.

In the airbag device M in accordance with the exemplary embodiment, furthermore, the joint of the left-right tether 51 to the circumferential wall 17 of the airbag 15 (the left joint 58L in the illustrated embodiment) is disposed at a position corresponding to the monitor 3 of the car navigation system (i.e. a protruding object) that protrudes from the instrument panel 1 partially at a side in the left and right direction of the bag body 16 as deployed, as shown in FIGS. 3 and 15. This configuration helps deploy the bag body 16 so that the bag body 16 may not be brought into contact with the monitor 3 protruding from the dashboard 1 partially. If such an advantageous effect does not have to be considered, the left-right tether does not have to be disposed at the position corresponding to the protruding object such as a monitor.

In the airbag device M in accordance with the exemplary embodiment, moreover, the front-rear tether 53 is composed of a band-shaped member having a broad width that is disposed generally along the up and down direction of the bag body 16 as deployed. The width of the jointed end portion (or rear end 53*b* portion) of the front-rear tether 53 by which the front-rear tether 53 is jointed to the passenger-side wall 25 is smaller than the width of the left-right tether 51. With this configuration, the front-rear tether 53 does not have to have a greater width than necessary. In other words, with this configuration, it will be possible to determine the width of the left-right tether 51 based on a size of the protruding object such as the monitor. In the illustrated embodiment, the width of the rear end 53*b* portion of the front-rear tether 53 (i.e. the length of the rear joint 60) is determined in accordance with a presumed trajectory of movement of the head MH moving forward at restraint of the passenger MP by the passenger-side wall 25. If such advantageous effects do not have to be considered, the width of the joint end portion of the front-rear tether to be joined to the passenger-side wall may be generally the same as, or greater than the width of the left-right tether. In the illustrated embodiment, the front-rear tether 53 has such a band shape a width of which is uniform in the front and rear direction. Alternatively, the front-rear tether may be formed into such a shape that has an identical width to that of the left-right tether in the front end portion to be jointed to the left-right tether and narrows toward the rear end (i.e. the jointed end) to be jointed to the passenger-side wall.

Figure 9:
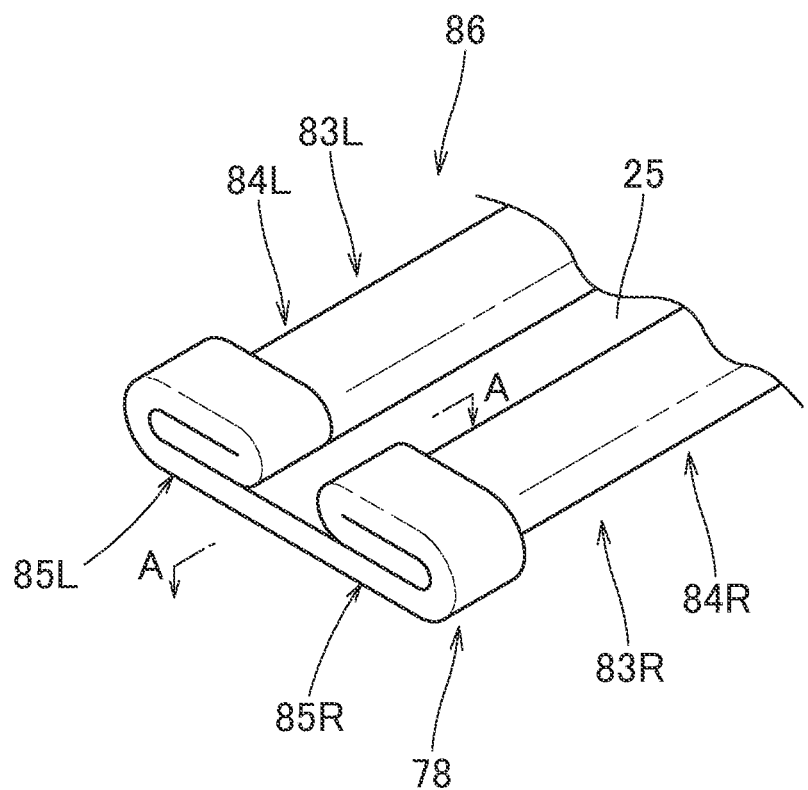
FIG. 9 is a schematic perspective view of a rear folded portion in a left-right contracted form that is obtained in the folding process of the airbag.
Figure 9:
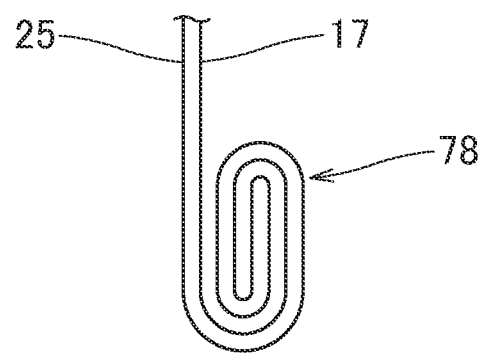
Figure 11A:
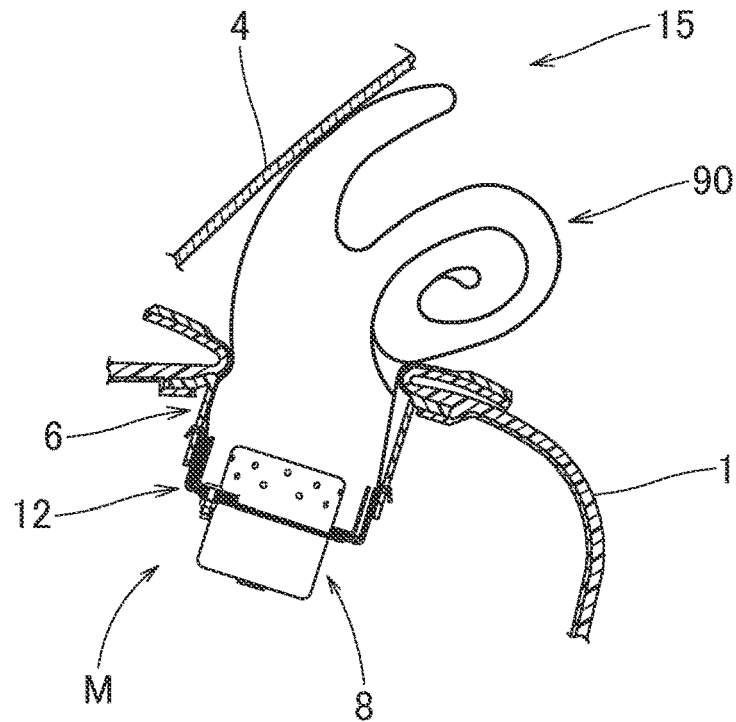
FIGS. 11A, 11B, 12A and 12B are schematic vertical sectional views illustrating the inflation process of the airbag in order.
Figure 11B:
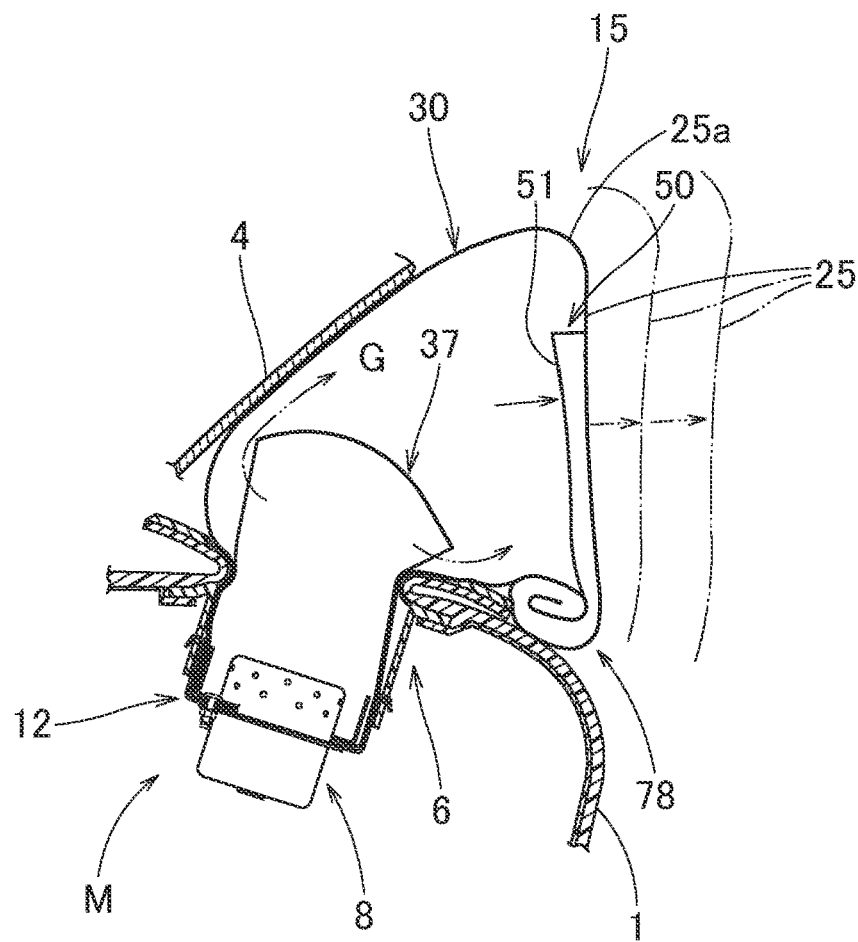
Figure 12A:
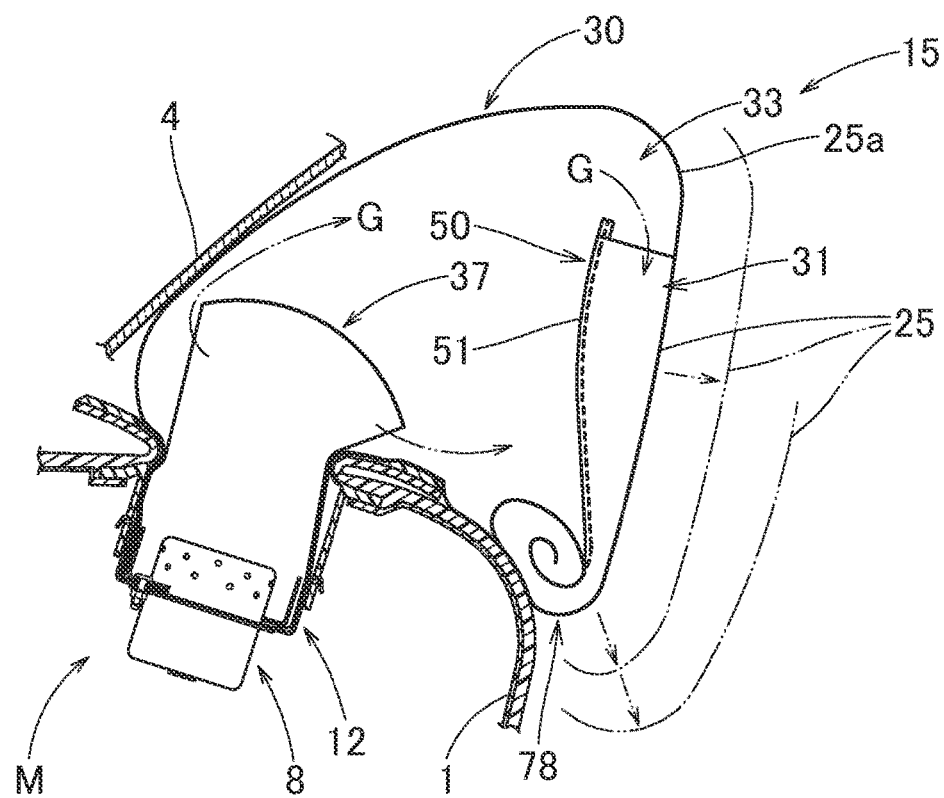
Figure 12B:
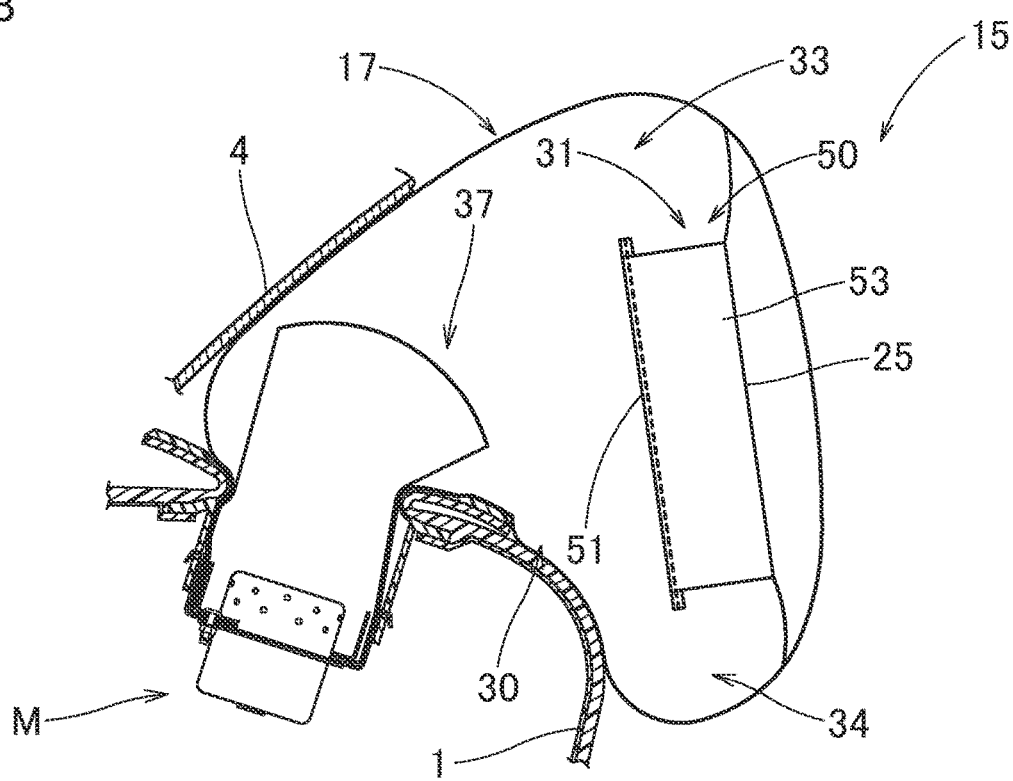

When the airbag 15 of the airbag device M in accordance with the exemplary embodiment is inflated with an inflation gas and deployed from the case (i.e. storage) 12, the folds formed by the second front-rear contracting folding unfold first, then the folds formed by the left-right contracting folding unfold, as shown in FIG. 11A. In the portion of the airbag 15 disposed farther to the rear from the inlet port 20, however, as shown in FIGS. 8A and 9, the rear folded portion 78 formed by folding the preparatory folded form 75 on the circumferential wall 17 is rolled from the left and right edges on the passenger-side wall 25. That is, this provides, in rear regions of the rolled portions 83L, 83R, a left and a right restrictive folded regions 85L, 85R (FIG. 9) that were formed by rolling the rear folded portion 78. Each of the restrictive folded regions 85L, 85R has been rolled more than once toward different directions (i.e. toward the circumferential wall 17 and toward the passenger-side wall 25) so that the folds or creases intersect one another generally perpendicularly. Accordingly, in a rear end portion of the airbag 15 (i.e. in a rear end portion of the preparatory folded form 75), the rear folded portion 78 hinders and delays unrolling of the rolled portions 83L, 83R. Also it takes time for the rear folded portion 78 itself to unfold. Thus, the rolled portions 83L, 83R unroll first in a front (or upper) portion of the airbag 15 where the rear folded portion 78 is not disposed (namely, general rolled portions 84L, 84R, as depicted in FIGS. 8A and 9), then unroll in the restrictive folded regions 85L, 85R formed on the rear folded portion 78, as can be seen in FIGS. 11B, 12A, 12B. This configuration of the airbag 15 is able to make an upper end 25*a* region of the passenger-side wall 25 stand up and deploy the passenger-side wall 25 widely in the up and down direction in an initial stage of airbag deployment as shown in FIG. 11B, then move the passenger-side wall 25 rearward in the widely unfolded state. As a consequence, the airbag device M in accordance with the exemplary embodiment is able to protect the passenger MP quickly with the passenger-side wall 25 as unfolded widely in the up and down direction. The airbag device M is able to delay the unfolding of the rear folded portion 78 adequately merely by rolling the rear folded portion 78 from the left and right edges (in other words, merely by forming the restrictive folded portions 85L, 85R) without using a separate regulating member as in conventional airbag devices for a passenger seat.

Therefore, the airbag device M in accordance with the exemplary embodiment is able to control deployment of the airbag 15 without using a separate regulating member, and able to protect the passenger MP smoothly.

In the airbag device M in accordance with the exemplary embodiment, in the front-rear contracted form 80 of the airbag 15, the rear folded portion 78 folds therein (i.e. includes) the lower end 60*a* portion of the rear joint 60 that joints the rear end 53*b* of the front-rear tether 53 to the passenger-side wall 25. That is, a lower end region of the rear end 53*b* portion of the front-rear tether 53 is folded together in the rear folded portion 78. With this configuration, in a phase of airbag deployment in which the upper end 25*a* portion of the passenger-side wall 25 is deployed generally upright while the rear folded portion 78 disposed in the lower side stays folded, the front-rear tether 53 is deployed such that only the upper portion that is not folded in the rear folded portion 78 is taut while the lower portion folded in the rear folded portion 78 is not taut or stretched, so that the passenger-side wall 25 in this phase is prevented from protruding rearward excessively. If such an advantageous effect does not have to be considered, the lower end portion of the rear joint that joints the rear end of the front-rear tether to the passenger-side wall does not have to be folded in the rear folded portion. The airbag may even be configured without a front-rear tether.

In the airbag device M in accordance with the exemplary embodiment, the tether section 50 disposed inside the bag body 16 includes the left-right tether 51 and the front-rear tether 53. The left-right tether 51 is composed of a band-shaped member having a broad width that is disposed generally along the up and down direction of the bag body 16 as deployed. The front-rear tether 53 is composed of a band-shaped member a width in the up and down direction of which is generally the same as that of the left-right tether 51, and connects the central portion in the left and right direction of the left-right tether 51 and the central portion in the left and right direction of the passenger-side wall 25. In the initial stage of airbag deployment, this configuration helps suppress an inflation gas G having flown into the airbag 15 via the inlet port 20 from directly pushing the passenger-side wall 25 rearward since the gas G hits the left-right tether 51 first, so that the inflation gas branches and flows upward and downward as shown in FIG. 13. Accordingly, the airbag 15 unfolds widely in the up and down direction instead of protruding rearward partially in the initial stage of deployment, and is inflated quickly without wobbling in the front and rear direction. Moreover, since the front-rear tether 53 is composed of the band-shaped member whose width in the up and down direction is generally the same as that of the left-right tether 51 and the lower end 60*a* portion of the rear joint 60 that joints the rear end 53*b* of the front-rear tether 53 to the passenger-side wall 25 is folded in the rear folded portion 78, the lower communication portion 34 formed between the lower end 51*d* of the left-right tether 51 and bag body 16 at airbag deployment is also folded in the rear folded portion 78 and closed, as shown in FIG. 7A. Therefore, the inflation gas is adequately prevented from flowing downward and rearward via the lower communication portion 34 in the initial stage of airbag deployment.

In the airbag device M in accordance with the exemplary embodiment, especially, the left-right tether 51 is composed of the band-shaped member having a broad width that is disposed generally along the up and down direction of the bag body 16 as deployed. In other words, the left-right tether 51 partitions an interior of the bag body 16 into the front and rear, i.e. into the front inflatable portion 30 and rear inflatable portion 31 so that the front inflatable portion 30 and rear inflatable portion 31 communicate with one another via the upper communication portion 33 and lower communication portion 34 that are formed between the upper end 51*c* and lower end 51*d* of the left-right tether 51, respectively, and the circumferential wall 17. With this configuration, in the initial stage of airbag deployment, the front inflatable portion 30 disposed in front of the left-right tether 51 is mainly inflated first as shown in FIG. 10A, then the rear inflatable portion 31 disposed at the rear of the left-right tether 51 is inflated with the inflation gas flown in via the upper communication portion 33 and lower communication portion 34, as shown in FIG. 10B. At the time the inflation gas flows into the rear inflatable portion 31, the left-right tether 51 has become taut (that is, a tensile force is exerted in the left and right direction), and this acts to exert a tensile force in the front and rear direction in the front-rear tether 53 as well and prevent the front-rear tether 53 from moving rearward, so that the front-rear tether 53 suppresses the rear inflatable portion 31 from oscillating or wobbling and prevents the passenger-side wall 25 from protruding rearward adequately. Furthermore, since the region of the airbag 15 forming the lower communication portion 34 is folded in the rear folded portion 78 as described above, prior to unfolding of the rear folded portion 78, the rear inflatable portion 31 is fed with the inflation gas only via the upper communication portion 33, as shown in FIG. 12A. That is, the shape of the airbag 15 as folded and the shape of the tether section 50 help the upper end 25*a* portion of the passenger-side wall 25 stand up and unfold the passenger-side wall 25 widely in the up and down direction in the initial stage of airbag deployment, and then moves the passenger-side wall 25 rearward in the widely unfolded state. Accordingly, the airbag 15 is able to protect the passenger MP quickly with the passenger-side wall 25 as unfolded widely in the up and down direction.

In the airbag device M in accordance with the exemplary embodiment, the rear folded portion 78 is rolled toward the circumferential wall 17 from the rear edge 76*a* of the preparatory folded form 75. However, the way of folding of the rear folded portion should not be limited thereby. By way of example, the rear folded portion may be formed by concertina folding on the circumferential wall. Nevertheless, in order to stay folded for a certain period of time at unfolding of the rolled portions in the upper portion of the airbag where the rear folded portion is not disposed and in order to unfold quickly thereafter, the rear folded portion is desirably folded by rolling toward the circumferential wall in a direction different from that of the left-right contracting folding.

An airbag device for a passenger seat of a vehicle in accordance with the exemplary embodiment is adapted to be installed in a storage in an instrument panel disposed in front of a passenger seat. The airbag device includes an airbag that has a folded form and is configured to be inflated and deployed rearward for protecting a passenger when fed with an inflation gas. The airbag includes a bag body that is formed of a sheet member having flexibility and includes: a passenger-side wall that is configured to be deployed toward the passenger seat; a circumferential wall that extends from a circumferential edge of the passenger-side wall to a front end portion of the bag body in a narrowing fashion, by which front end portion the bag body is configured to be mounted on the storage, the circumferential wall including a left wall and a right wall that are opposed to one another at airbag deployment; and an inlet port that is disposed in the front end portion of the circumferential wall for receiving the inflation gas. The airbag further includes a tether section that is disposed inside the bag body for controlling a shape of the bag body as inflated. The tether section includes: a left-right tether that connects the left wall and the right wall of the circumferential wall for regulating a distance between the left wall and right wall at airbag deployment, the left-right tether being configured to be deployed generally along a left and right direction of the bag body as deployed; and a front-rear tether that connects a central portion in a left and right direction of the left-right tether and a central portion in a left and right direction of the passenger-side wall for preventing the passenger-side wall from protruding rearward at airbag deployment, the front-rear tether being configured to be deployed in a front and rear direction of the bag body as deployed.

In the airbag device in accordance with the exemplary embodiment, the tether section for controlling the shape of the bag body as inflated includes the left-right tether that connects the left wall and right wall of the bag body, and the front-rear tether that is formed to extend rearward from the left-right tether. With this configuration, the tether section generally forms a T shape as viewed from above. In comparison with a conventional airbag in which a front-rear tether and a left-right tether are separately disposed inside the bag body in a cross shape, this configuration helps reduce an amount of material for forming the tether. It also helps reduce a connecting amount of the tether section to the bag body, which simplifies the connecting work as well. As a consequence, the above configuration simplifies the structure of the airbag itself, so that the airbag as folded is compact, as well as the airbag device itself. Moreover, also in the airbag device in accordance with the exemplary embodiment, the left-right tether of the tether section regulates the distance between the left wall and right wall, and the front-rear tether prevents the passenger-side wall from protruding rearward, so that the outer shape of the bag body as inflated is controlled adequately.

Therefore, with the airbag device for a passenger seat in accordance with the exemplary embodiment, the airbag as folded is compact with a simple structure, and the airbag is controlled adequately in shape as deployed.

In various embodiments, the left-right tether may be composed of a band-shaped member having a broad width that is disposed generally along an up and down direction of the bag body as deployed, and partition an interior of the bag body as inflated into a front inflatable portion and a rear inflatable portion while forming a gas communication portion in a vicinity of each of an upper end and a lower end of the left-right tether. In an initial stage of inflation of the bag body configured as described above, the front inflatable portion that is disposed in front of the left-right tether is inflated first, then the rear inflatable portion that is disposed at the rear of the left-right tether is inflated with an inflation gas flown in from the gas communication portions. At the time the inflation gas flows into the rear inflation portion, the left-right tether that partitions the front inflatable portion from the rear inflatable portion has become taut, and this prevents the front-rear tether that extends from the left-right tether from moving rearward, so that the front-rear tether suppresses the rear inflatable portion from oscillating or wobbling and prevents the passenger-side wall from protruding rearward adequately.

In various embodiments, the airbag device may be configured such that the airbag further includes a redirecting cloth that is disposed over the inlet port inside the bag body for redirecting the inflation gas having flown into the bag body from the inlet port in the front and rear direction of the bag body, the redirecting cloth including an outlet port of the inflation gas at a rear end portion thereof, and that the left-right tether is configured so that an upper end of the left-right tether is located at a higher position than an upper end of the outlet port of the redirecting cloth, and a lower end of the left-right tether is located at a lower position than a lower end of the outlet port, at airbag deployment on board.

With this configuration, in the initial stage of airbag deployment, an inflation gas that exits the rear outlet port of the redirecting cloth and heads rearward hits the left-right tether and does not directly push the passenger-side wall rearward. Instead, the inflation gas branches and flows upward and downward at hitting the left-right tether. Accordingly, the above configuration helps deploy the bag body widely in the up and down direction while suppressing rearward protrusion in the initial stage of airbag deployment, and suppresses the bag body from wobbling or oscillating in the front and rear direction. Thus, the airbag is deployed quickly.

In various embodiments, a joint of the left-right tether to the circumferential wall of the bag body may be disposed at a position corresponding to a protruding object that protrudes partially from the instrument panel at a side in the left and right direction of the bag body as deployed. This configuration helps deploy the bag body so that the bag body may not be brought into contact with the protruding object such as a monitor that protrudes partially from the instrument panel.

In various embodiments, the front-rear tether may be composed of a band-shaped member having a broad width that is disposed generally along the up and down direction of the bag body as deployed, and a width of a jointed end portion of the front-rear tether by which the front-rear tether is jointed to the passenger-side wall may be smaller than a width of the left-right tether. With this configuration, the front-rear tether does not have to have a greater width than necessary. In other words, with this configuration, it will be possible to determine the width of the left-right tether based on a size of the protruding object.

An airbag device for a passenger seat of a vehicle in accordance with another exemplary embodiment is adapted to be installed in a storage in an instrument panel disposed in front of a passenger seat. The airbag device includes an airbag that has a folded form and is configured to be inflated and deployed rearward for protecting a passenger when fed with an inflation gas. The airbag is formed of a sheet member having flexibility, and includes a passenger-side wall that is configured to be deployed toward the passenger seat; a circumferential wall that extends from a circumferential edge of the passenger-side wall to a front end portion of the airbag in a narrowing fashion, by which front end portion the airbag is configured to be mounted on the storage; and an inlet port that is disposed in the front end portion of the circumferential wall for receiving the inflation gas. The folded form of the airbag has been formed through: a preparatory folding that develops the passenger-side wall generally flatly and folds the circumferential wall on one or more valley folds so that the passenger-side wall as developed is brought close to the inlet port, the preparatory folding providing a preparatory folded form of the airbag; a first front-rear contracting folding that contracts a width in a front and rear direction of the airbag, the first front-rear contracting folding providing a front-rear contracted form of the airbag; a left-right contracting folding that contracts a width in a left and right direction of the airbag after the first front-rear contracting folding, the left-right contracting folding providing a left-right contracted form of the airbag; and a second front-rear contracting folding that contracts the width in the front and rear direction of the airbag after the left-right contracting folding. The front-rear contracted form of the airbag includes a rear folded portion in which a portion of the preparatory folded form disposed farther to the rear from the inlet port is folded toward the circumferential wall on a plurality of creases extending in the left and right direction so that a rear end of the preparatory folded form comes close to the inlet port. The left-right contracted form of the airbag includes a left and a right rolled portions in which a left and a right edge portions of the front-rear contracted form are rolled toward the passenger-side wall.

When the airbag of the airbag device in accordance with the above exemplary embodiment is inflated with an inflation gas and deployed from the storage, the folds formed by the second front-rear contracting folding unfold first, then the folds formed by the left-right contracting folding unfold. In the portion of the airbag disposed farther to the rear from the inlet port, however, the rear folded portion formed by folding the preparatory folded form on the circumferential wall is rolled from the left and right edges on the passenger-side wall. That is, a rear region of each of the left and right rolled portions (in other words, a portion formed by rolling the rear folded portion) has been folded more than once toward different directions (i.e. toward the circumferential wall and toward the passenger-side wall) so that the folds or creases intersect one another generally perpendicularly. Accordingly, in a rear end portion of the airbag (i.e. in a rear end portion of the preparatory folded form), the rear folded portion hinders and delays unrolling of the left and right rolled portions. Also it takes time for the rear folded portion itself to unfold. Thus, the left and right rolled portions unroll first in a front (or upper) portion of the airbag where no rear folded portion is disposed, then unroll in the rear folded portion. This configuration of the airbag is able to make an upper end region of the passenger-side wall stand up and deploy the passenger-side wall widely in the up and down direction in an initial stage of airbag deployment, then move the passenger-side wall rearward in the widely unfolded state. As a consequence, the airbag device in accordance with the exemplary embodiment is able to protect a passenger with the passenger-side wall as unfolded widely in the up and down direction. The airbag device is able to delay the unfolding of the rear folded portion adequately merely by rolling the rear folded portion from the left and right edges without using a separate regulating member as in conventional airbag devices for a passenger seat.

Therefore, the airbag device in accordance with the exemplary embodiment is able to control deployment of the airbag without using a separate regulating member, and able to protect the passenger smoothly.

In various embodiments, the airbag may be configured as follows: The airbag includes a bag body that is inflatable with an inflation gas, and a tether section that is disposed inside the bag body for controlling a shape of the bag body as inflated. The tether section includes a front-rear tether that is configured to be disposed generally along a front and rear direction of the bag body as deployed, and jointed to the passenger-side wall by the rear end for preventing the passenger-side wall from protruding rearward at airbag deployment. The rear folded portion of the front-rear contracted form of the airbag folds therein (or include) a lower end portion of a joint of the front-rear tether to the passenger-side wall.

With the above configuration, a lower end region of the rear end portion of the front-rear tether is folded together in the rear folded portion. With this configuration, in a phase of airbag deployment in which the upper end portion of the passenger-side wall is deployed generally upright while the rear folded portion disposed in the lower side stays folded, the front-rear tether is deployed such that only the upper portion that is not folded in the rear folded portion is taut while the lower portion folded in the rear folded portion is not taut or stretched, so that the passenger-side wall in this phase is prevented from protruding rearward excessively.

In various embodiments, the airbag device may be configured such that:

the tether section further includes, in addition to the front-rear tether, a left-right tether that connects a left wall and a right wall of the circumferential wall opposed in the left and right direction for regulating a distance between the left wall and right wall at airbag deployment, the left-right tether being configured to be deployed generally along the left and right direction of the bag body as deployed;

the left-right tether is composed of a band-shaped member having a broad width that is disposed generally along an up and down direction of the bag body as deployed;

the front-rear tether is composed of a band-shaped member a width in an up and down direction of which is generally the same as that of the left-right tether; and the front-rear tether connects a central portion in a left and right direction of the left-right tether and a central portion in a left and right direction of the passenger-side wall.

In the initial stage of airbag deployment, the above configuration helps suppress an inflation gas having flown into the airbag via the inlet port from directly pushing the passenger-side wall rearward since the gas hits the left-right tether first, so that the inflation gas branches and flows upward and downward. Accordingly, the airbag unfolds widely in the up and down direction instead of protruding rearward partially in the initial stage of deployment, and is inflated quickly without wobbling in the front and rear direction. Moreover, since the front-rear tether is composed of the band-shaped member whose width in the up and down direction is generally the same as that of the left-right tether and the lower end portion of the joint that joints the rear end of the front-rear tether to the passenger-side wall is folded in the rear folded portion, a lower end portion of the left-right tether is also folded in the rear folded portion and closed. Therefore, the inflation gas is adequately prevented from flowing downward and rearward via a region in a vicinity of the lower end portion of the left-right tether in the initial stage of airbag deployment.

What is claimed is:

1. An airbag device for a passenger seat of a vehicle adapted to be installed in a storage in an instrument panel disposed in front of a passenger seat, the airbag device comprising an airbag that has a folded form and is configured to be inflated and deployed rearward for protecting a passenger when fed with an inflation gas, wherein the airbag includes:

a bag body that is formed of a sheet member having flexibility and includes a passenger-side wall that is configured to be deployed toward the passenger seat; a circumferential wall that extends from a circumferential edge of the passenger-side wall to a front end portion of the bag body in a narrowing fashion, by which front end portion the bag body is configured to be mounted on the storage, the circumferential wall including a left wall and a right wall that are opposed to one another at airbag deployment; and an inlet port that is disposed in the front end portion of the circumferential wall for receiving the inflation gas; and a tether section that is disposed inside the bag body for controlling a shape of the bag body as inflated; and wherein the tether section includes:

a left-right tether that connects the left wall and the right wall of the circumferential wall for regulating a distance between the left wall and right wall at airbag deployment, the left-right tether being configured to be deployed generally along a left and right direction of the bag body as deployed; and a front-rear tether that connects a central portion in a left and right direction of the left-right tether and a central portion in a left and right direction of the passenger-side wall for preventing the passenger-side wall from protruding rearward at airbag deployment, the front-rear tether being configured to be deployed in a front and rear direction of the bag body as deployed, wherein:

the left-right tether is composed of a band-shaped member having a broad width that is disposed generally along an up and down direction of the bag body as deployed; and the left-right tether partitions an interior of the bag body as inflated into a front inflatable portion and a rear inflatable portion while forming a gas communication portion in a vicinity of each of an upper end and a lower end of the left-right tether;

in an initial stage of inflation of the bag body, the front inflatable portion, being disposed in front of the left-right tether, is inflated first, then the rear inflatable portion, being disposed at a rear of the left-right tether, is inflated with the inflation gas having flown in from the gas communication portion.

2. The airbag device of claim 1, wherein:

the airbag further includes a redirecting cloth that is disposed over the inlet port inside the bag body for redirecting the inflation gas having flown into the bag body from the inlet port in the front and rear direction of the bag body, the redirecting cloth including an outlet port of the inflation gas at a rear end portion thereof; and the left-right tether is configured so that an upper end of the left-right tether is located at a higher position than an upper end of the outlet port of the redirecting cloth, and a lower end of the left-right tether is located at a lower position than a lower end of the outlet port, at airbag deployment on board.

3. The airbag device of claim 1, wherein a joint of the left-right tether to the circumferential wall of the bag body is disposed at a position corresponding to a protruding object that protrudes partially from the instrument panel at a side in the left and right direction of the bag body as deployed.

4. The airbag device of claim 1, wherein:

the front-rear tether is composed of a band-shaped member having a broad width that is disposed generally along the up and down direction of the bag body as deployed; and a width of a jointed end portion of the front-rear tether by which the front-rear tether is jointed to the passenger-side wall is smaller than a width of the left-right tether.

5. An airbag device for a passenger seat of a vehicle adapted to be installed in a storage in an instrument panel disposed in front of a passenger seat, the airbag device comprising an airbag that has a folded form and is configured to be inflated and deployed rearward for protecting a passenger when fed with an inflation gas, wherein the airbag is formed of a sheet member having flexibility;

wherein the airbag includes a passenger-side wall that is configured to be deployed toward the passenger seat; a circumferential wall that extends from a circumferential edge of the passenger-side wall to a front end portion of the airbag in a narrowing fashion, by which front end portion the airbag is configured to be mounted on the storage; and an inlet port that is disposed in the front end portion of the circumferential wall for receiving the inflation gas;

wherein the folded form of the airbag has been formed through:

a preparatory folding that develops the passenger-side wall generally flatly and folds the circumferential wall on one or more valley folds so that the passenger-side wall as developed is brought close to the inlet port, the preparatory folding providing a preparatory folded form of the airbag;

a first front-rear contracting folding that contracts a width in a front and rear direction of the airbag, the first front-rear contracting folding providing a front-rear contracted form of the airbag;

a left-right contracting folding that contracts a width in a left and right direction of the airbag after the first front-rear contracting folding, the left-right contracting folding providing a left-right contracted form of the airbag; and a second front-rear contracting folding that contracts the width in the front and rear direction of the airbag after the left-right contracting folding;

wherein the front-rear contracted form of the airbag includes a rear folded portion in which a portion of the preparatory folded form disposed farther to the rear from the inlet port is folded toward the circumferential wall on a plurality of creases extending in the left and right direction so that a rear end of the preparatory folded form comes close to the inlet port; and wherein the left-right contracted form of the airbag includes a left and a right rolled portions in which a left and a right edge portions of the front-rear contracted form are rolled toward the passenger-side wall.

6. The airbag device of claim 5, wherein:

the airbag includes a bag body that is inflatable with an inflation gas and a tether section that is disposed inside the bag body for controlling a shape of the bag body as inflated;

the tether section includes a front-rear tether that is configured to be deployed generally along a front and rear direction of the bag body as deployed, and jointed to the passenger-side wall by a rear end thereof for preventing the passenger-side wall from protruding rearward at airbag deployment; and the rear folded portion of the front-rear contracted form of the airbag folds therein a lower end portion of a joint of the front-rear tether to the passenger-side wall.

7. The airbag device of claim 6, wherein:

the tether section further includes a left-right tether that connects a left wall and a right wall of the circumferential wall opposed in the left and right direction for regulating a distance between the left wall and right wall at airbag deployment, the left-right tether being configured to be deployed generally along the left and right direction of the bag body as deployed;

the left-right tether is composed of a band-shaped member having a broad width that is disposed generally along an up and down direction of the bag body as deployed;

the front-rear tether is composed of a band-shaped member a width in an up and down direction of which is generally the same as that of the left-right tether; and the front-rear tether connects a central portion in a left and right direction of the left-right tether and a central portion in a left and right direction of the passenger-side wall.

* * * * *